Nov. 25, 1958

A. DUCAMP ET AL 2,862,060

ELECTRICAL CONNECTING CIRCUITS

Filed May 19, 1954

Inventors
A. DUCAMP·
M. DEN HERTOG
By Robert Hardley Jr.
Attorney

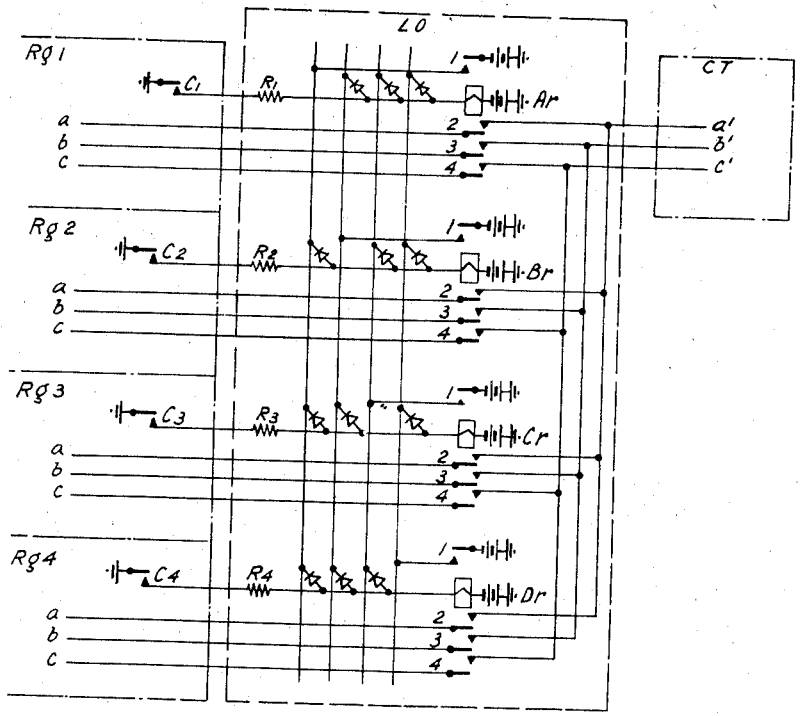
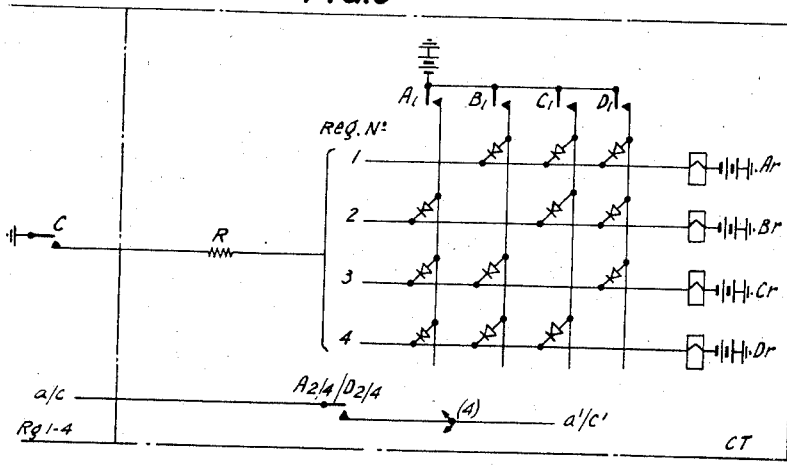

Nov. 25, 1958  A. DUCAMP ET AL  2,862,060
ELECTRICAL CONNECTING CIRCUITS
Filed May 19, 1954
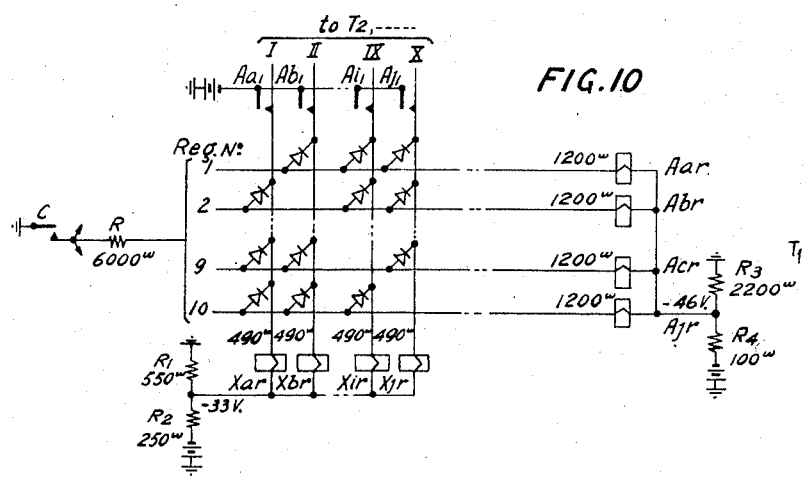
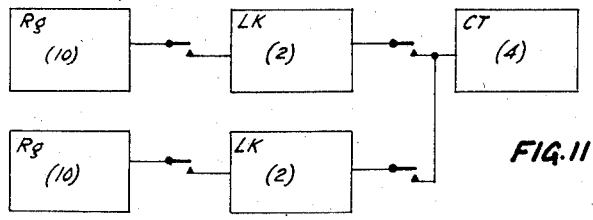
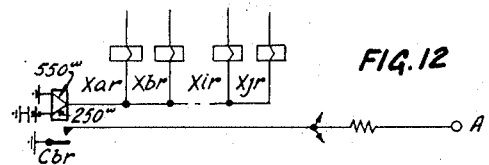
Inventors
A. DUCAMP
M. DEN HERTOG Nov. 25, 1958  A. DUCAMP ET AL  2,862,060
ELECTRICAL CONNECTING CIRCUITS
Filed May 19, 1954  14 Sheets-Sheet 9
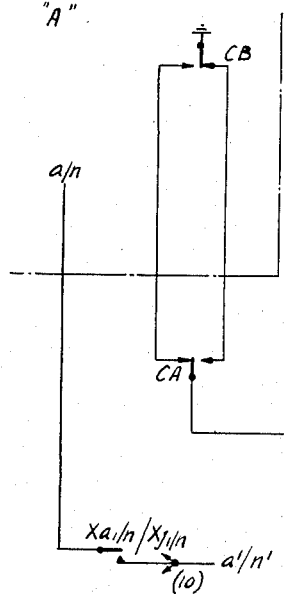
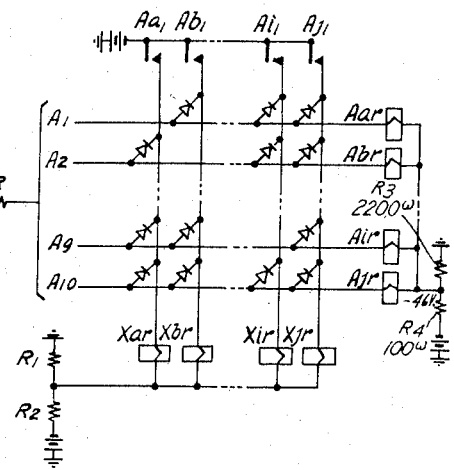
FIG. 18
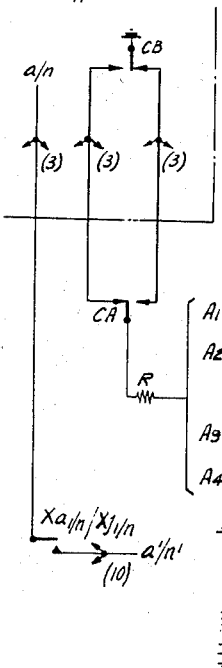
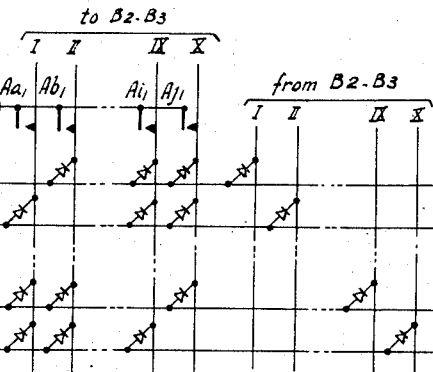
FIG. 19
Inventors
A. DUCAMP-
M. DEN HERTOG
By Robert Hardy
Attorney

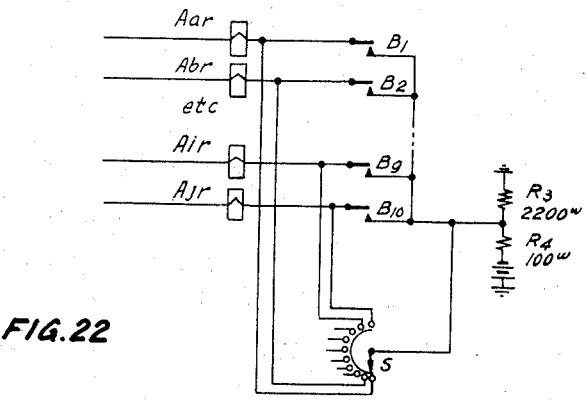
FIG.22
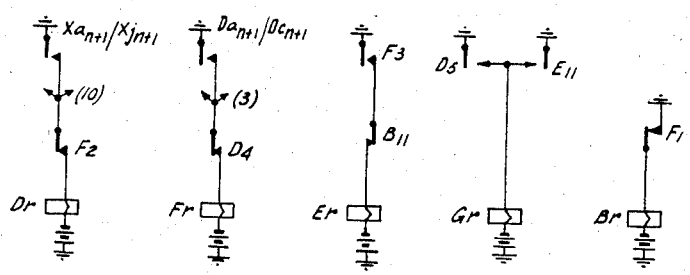

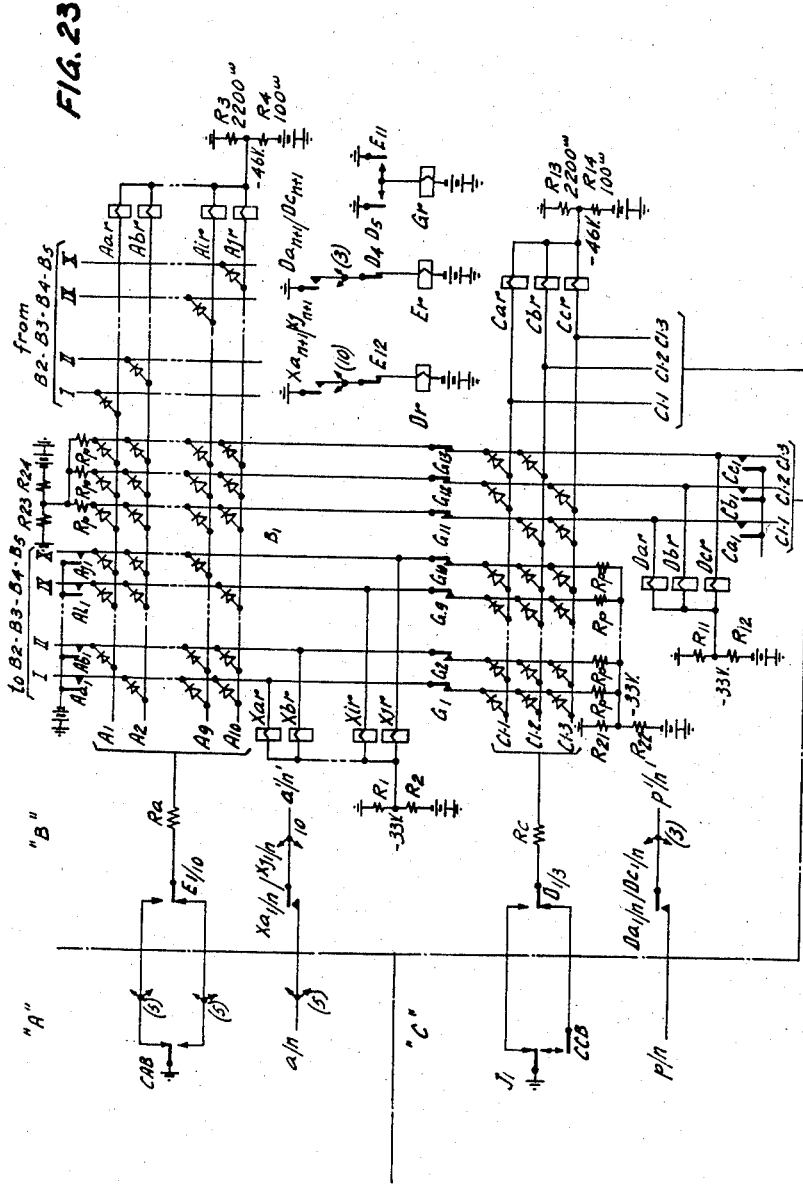

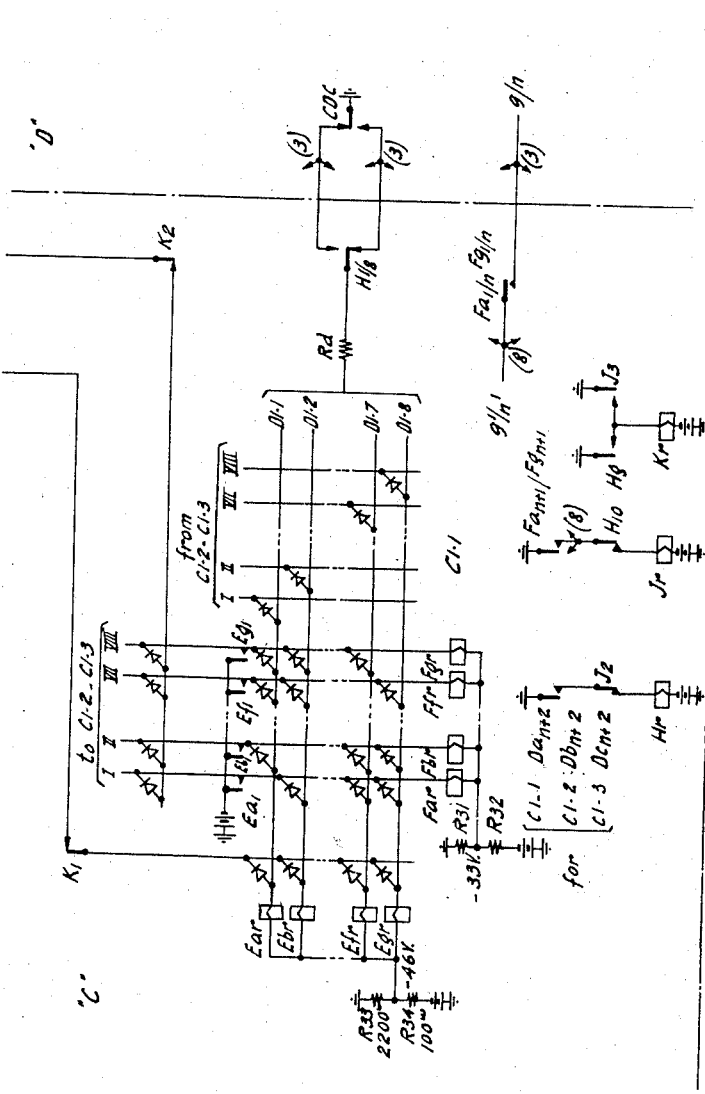

United States Patent Office

2,862,060
Patented Nov. 25, 1958

2,862,060

ELECTRICAL CONNECTING CIRCUITS

André Ducamp and Martinus den Hertog, Antwerp, Belgium, assignors to International Standard Electric Corporation, New York, N. Y.

Application May 19, 1954, Serial No. 430,959

Claims priority, application Great Britain May 29, 1953

16 Claims. (Cl. 179—18)

This invention relates to means for detecting the application of an electrical condition to any one of a number of electrical conductors and to identify a particular conductor to which said condition has been applied by means of a group of detector devices.

The object of the invention is to provide lock-out arrangements between the detector devices so as to ensure individual response to a single electrical condition at a time. Such lock-out arrangements using electromagnetic contact-making relays are known and have been described in an article in Bell Laboratories Record, volume 18, entitled Lock-Out Circuits by F. A. Korn, published in September 1939. In the known circuits, relay operation has been controlled by chain circuits of the relay contacts: in such circuits a definite order of operation exists in response to simultaneous attempts to operate due to the arrangement of the chain circuits.

One feature of the present invention comprises a discriminating method for operating one of a number of detector devices by means of an operating electrical condition applied to a corresponding one of a number of conductors and lock-out equipment for ensuring that only one detector device effectively operates at a time; characterised in this that when a plurality of detector devices attempt to operate simultaneously in response to simultaneous conditions on a plurality of said conductors they all have an equal chance to operate, that an arbitrary one of said detector devices will effectively operate, and that the operation of any one of said detector devices applies similar lock-out conditions to all said other detector devices.

Another feature of the invention comprises discriminating method for operating a plurality out of a number of detector devices by means of an operating electrical condition applied to a corresponding one of a plurality of electrical conductors each of which is permanently connected to a corresponding plurality of detector devices, characterised in this that lock-out equipment ensures that only one plurality of detector devices effectively operates when electrical conditions are applied simultaneously to two or more conductors, and ensures that when one plurality of detector devices has effectively operated in response to an electrical condition on one conductor, the consequent connection of an electrical condition to any other conductor will not operate the corresponding detector devices.

A further feature of the invention comprises means for determining on which of a number of conductors an electrical condition is applied comprising a number of detector devices accessible via said conductors and adapted to be selectively operated according to which conductor receives the electrical condition characterised by lock-out means adapted to complete lock-out circuits for preventing application of effective operating conditions to any combination of detector devices which remain unoperated when selective operation has taken place in response to application of said electrical condition to any one of said conductors.

In the embodiments of the invention to be described, rectifier networks are used for lock-out purposes.

It is already known to use, for identifying a terminal to which is applied a characteristic electrical condition out of a plurality of terminals, matrices of rectifiers with a cross-wire network the terminals to be identified being connected to the input vertical (or horizontal) wires of the networks whilst the output horizontal (or vertical) wires of the network are connected to one or more groups of relays, the identity of an input terminal to which is applied the characteristic electrical condition being characterised by the location and position of one or more operated relays in a group, or by the location of one operated relay in each group of relays. Reference is made to the article by Dr. Brown and N. Rochester (Proceedings of the I. R. E., February 1949, volume 37, page 139) entitled "Rectifier Networks for Multiposition Switching" and to the article by C. H. Page (Electronics, September 1948, page 110) entitled "Digital Computer Switching Circuits" and more particularly to page 116 of the mentioned article Fig. 4(C) showing the subdivision of a matrix in subgroups so as to reduce the number of rectifiers to be used.

However when using such rectifier networks no lock-out arrangements has been provided to prevent two or more combinations of identifying relays from operating simultaneously or at very short interval when the characteristic electrical condition appears simultaneously or at very short interval on two or more input terminals. Therefore such rectifier circuits cannot be used, in the telecommunication applications where the electrical condition (corresponding to calling, free, busy) must be identified for one outlet only at a time.

The invention will be described with reference to certain embodiments shown in the accompanying drawings in which:

Fig. 4 shows as an example the manner in which the interconnection between four registers and a common translator, with lock-out facilities is realised according to the invention.

Fig. 5 shows the same arrangement as shown in Fig. 1, but with certain conventions for simplifying the drawing and the description of the embodiment.

Fig. 10 shows a modification of the arrangement of Fig. 9 in which one of the winding terminals of each connecting relay is also connected to a common intermediate point of a potentiometer.

Fig. 11 shows a block diagram representing an alternative arrangement in which register circuits are connected to a common translator via two successive stages of connecting equipment.

Fig. 12 shows as an example a relay inserted in series with the auxiliary relay circuits to start a second connecting stage when the connection at a first connecting stage has been completed.

Figs. 18, 19, 20, 21, 22, 23 and 24 together show respectively the detailed circuits of the block diagrams shown at Figs. 13 to 17.

Figure 21:
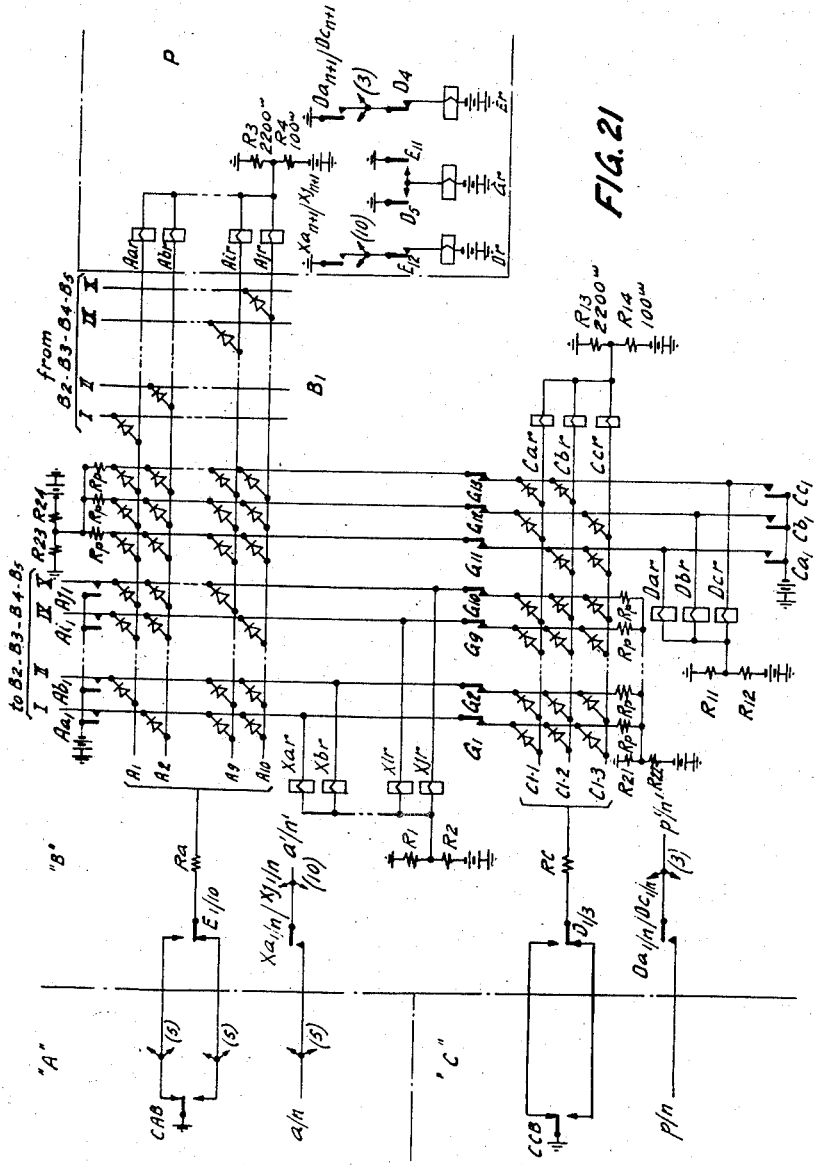

Fig. 22 shows a modification of Fig. 21 providing an arrangement for connecting selectively a circuit out of one of the group of circuits.

Figure 1:
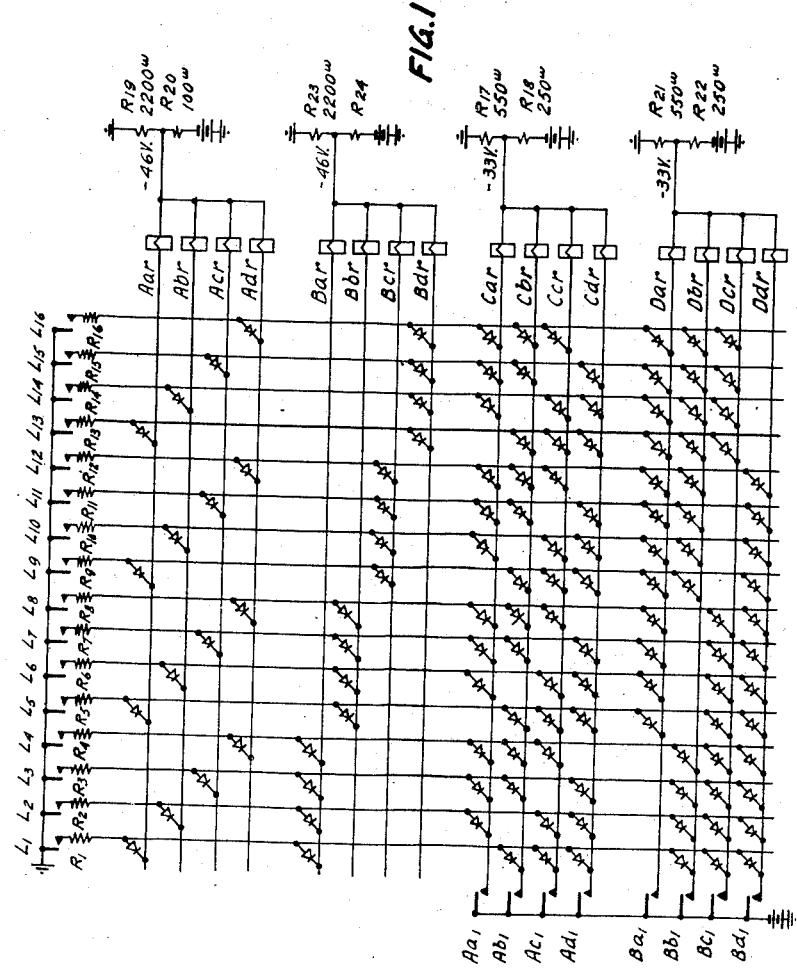
Fig. 1 shows an embodiment of a matrix of rectifiers to identify for instance sixteen input terminals, comprising as an example two groups of four identifying relays the contacts of which are used to apply a lock-out potential for preventing two or more identifying relay combinations from operating simultaneously according to the invention.

Fig. 1 shows an arrangement in which 16 different electrical circuits may be identified by two groups of each four relays, denominated $Aar$ to $Adr$ and $Bar$ to $Bdr$ respectively. Each of these relays carries a contact $Aa_1$ to $Ad_1$ and $Ba_1$ to $Bd_1$ respectively, which contacts serve for the operation of auxiliary relays $Car$ to $Cdr$ and $Dar$ to $Ddr$ respectively, of which the functions have not been represented on the drawing. Moreover these contacts fulfil a second purpose which will now be explained:

Resistances $R_1$ to $R_{16}$ are inserted in each of the leads from the different electrical circuits to be identified, so that the relays $Aar$ to $Adr$ and $Bar$ to $Bdr$ have to operate in series with these resistances. The make contacts of these relays are connected via rectifiers for each relay in such a manner that when the relay operates a battery will be connected to each lead from the different resistances associated with the electrical circuits for which the relay in question must not operate. For example, the make contact of relay $Aar$ which operates for electrical circuit contacts $L_1$, $L_5$, $L_9$ and $L_{13}$ will apply a battery via one rectifier each to the resistances of all remaining electrical circuits. The purpose of this is to avoid that more than one relay in each group will operate in case more than one of the electrical circuits would close its contact simultaneously or successively. For example, assuming that electrical circuits Nos. 1 and 2 would close their contacts $L_1$ and $L_2$ respectively, circuits would be closed via resistances $R_1$ and $R_2$ for the operation of relays $Aar$ and $Abr$. Relay $Aar$, by operating, now applies battery to resistance $R_2$, thereby preventing the operation of relay $Abr$, and reciprocally $Abr$, by operating, applies battery to resistance $R_1$, thereby preventing the operation of relay $Aar$. In practice the result of this arrangement will be that only one of the two relays will operate and keep the other short-circuited which means that only one of the two circuits that have their contacts closed will be identified. It will be seen that in the example referred to, the two circuits cause the same relay to operate in the second group, viz: relay $Bar$, so that when either $Aar$ or $Abr$ succeeds in operating definitely and prevents the other one from operating, this operated relay together with $Bar$ will indicate either the closure of contact $L_1$ or $L_2$, depending on whether $Aar$ or $Abr$ succeeded in operating.

It will be seen in a similar manner that when e. g. electrical circuits Nos. 1 and 5 would close their contacts $L_1$ and $L_5$ simultaneously, they both would cause the operation of relay $Aar$, but that they would attempt to operate different relays of the second group, viz: $Bar$ or $Bbr$. Also these relays have their make contacts so connected that they apply battery to the resistances of all electrical circuits for which they must not operate and accordingly, of the second group of relays also only one at a time may finally succeed in remaining operated.

A particular case now arises when two electrical circuits would close their contacts simultaneously that cause different relays to operate in both groups. For example, when circuits Nos. 1 and 6 would close their contacts $L_1$ and $L_6$ simultaneously, relays $Aar$ and $Bar$ would attempt to operate for circuit No. 1, and relays $Abr$ and $Bdr$ for circuit No. 6. From what has been said above, it will now be clear that in each group finally only one relay will remain operated, but it could be assumed that the two relays that remain operated in the two groups do not correspond to either of the two electrical circuits which closed its contact. For example, if in the first group relay $Aar$ succeeded in operating and in the second group relay $Bbr$ would succeed in operating, the combination of operated relays $Aar$ and $Bbr$ would not correspond to either of electrical circuits No. 1 or 6, but to circuit No. 5. In reality this cannot happen because it will be seen that if these two relays would actually be operated, they would also short circuit one another. The short circuit for relay $Bbr$ may be traced from battery to make contact $Aa_1$ and via the rectifier which leads to resistance $R_6$. The battery connected to resistance $R_6$ in this way will namely prevent operating current to flow through the winding of relay $Bbr$. On the other hand, if $Bbr$ would be operated, battery would be connected from make contact $Bb_1$ via the rectifier leading to resistance $R_1$, which has the effect of preventing operating current to flow through the winding of $Aar$. It will, therefore, be seen that such a wrong combination of relays, even if it would succeed in operating momentarily, could not remain operated, as such relays would always short circuit one another. The final result will be that a combination definitely succeeds in operating which corresponds to one of the two electrical circuits having their contacts closed. For example, if in the example assumed above, in which contacts $L_1$ and $L_6$ were assumed to be closed, relays $Aar$ and $Bar$ finally succeed in operating, these two relays will prevent the operation of relays $Abr$ and $Bbr$ and by their operated condition would indicate the identity of electrical circuit No. 1. It will be seen that with relay $Aar$ and $Bar$ operated, neither of these two relays is short circuited by the other.

It is also possible in the case assumed that finally relays $Abr$ and $Bbr$ succeed in operating, in which case they keep relays $Aar$ and $Bar$ short-circuited and do not short circuit one another. The operated condition of these two relays by their combination indicates electrical circuit No. 6.

It will be seen that the two groups of relays $Aar$ to $Adr$ and $Bar$ to $Bdr$ are not connected to full battery potential, but to a potential divider $R_{19}$, $R_{20}$ and $R_{23}$, $R_{24}$ respectively, which provides a potential of some 2 v. below the full battery potential which is assumed to be −48 v. The purpose of this is to take care of a drop of potential arising in a rectifier when a circuit is closed through it to short circuit one of these relays. For example, in the case assumed above with contacts $L_1$ and $L_2$ closed and relay A$ar$ operated, battery will be closed from make contact A$a_1$ via a rectifier to resistance $R_2$ and a drop of potential of between 1 and 2 v. will occur in this rectifier, so that the potential prevailing on the lead between the rectifier and the resistance is something between −46 v. and −47 v. By connecting relay A$br$ to −46 v. the potential at the two ends of its winding will be approximately equal or there may be a small difference of potential in the direction opposite to that applied for its operation. This will tend to release the relays very rapidly in case two or more of them should have operated in the same group.

The auxiliary relays C$ar$ to C$dr$ and D$ar$ to D$dr$ are equally connected to a potential divider $R_{17}$, $R_{18}$ and $R_{21}$, $R_{22}$ respectively, of which the purpose is to reduce the potential normally prevailing on the rectifiers, so that a single disc may be used for each rectifier shown.

Figure 2:
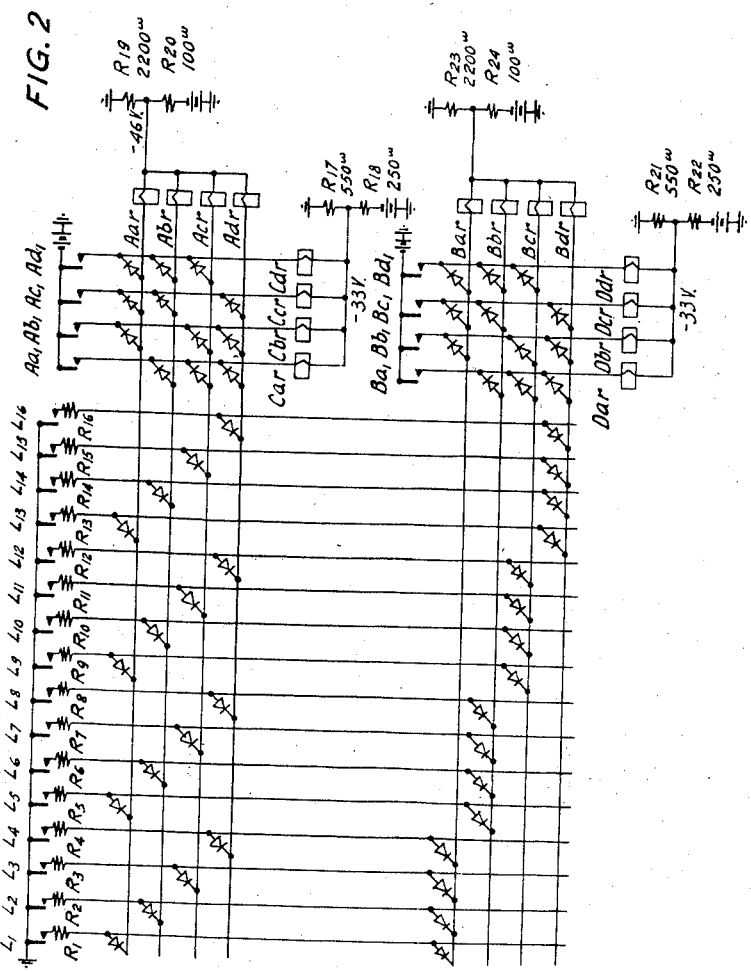
Fig. 2 shows another arrangement of said embodiment according to the invention in which the identifying relay contacts are so connected to the identifying relays to be locked out that the number of rectifiers used is much smaller.

Fig. 2 shows an alternative to Fig. 1, in which the battery applied from make contacts A$ar$ to A$dr$ and B$ar$ to B$dr$ is not applied via rectifiers to the resistances provided for each of the electrical circuits, but is provided directly to the windings of the other relays of the same group. Thus, make contact A$a_1$ via three rectifiers will connect battery, when operated, to relays A$br$, A$cr$ and A$dr$. In such a manner each relay will prevent the others of the same group from operating. The effect of this arrangement is the same as for the arrangement as known by Fig. 1, and it may be shown that when two or more electrical circuits would close their contacts simultaneously or consecutively, only a single relay in each group would finally succeed in remaining operated in a combination that indicates one of these electrical circuits that closed its contact.

As compared with Fig. 1, Fig. 2 uses fewer rectifiers for the purpose of preventing more than one relay to operate in each group. However, it should be pointed out that the current which has to be carried by each of these rectifiers is much larger in Fig. 2 than in Fig. 1. In Fig. 1 the maximum current that may pass through each of the rectifiers connected to the make contacts A$a_1$, etc. is that which flows through one of the resistances $R_1$ to $R_{16}$. Even if all of the electrical circuits would close their contacts simultaneously, each rectifier in Fig. 1 would have to carry maximum the full current passing through one resistance only. This is different with Fig. 2, which may be seen as follows:

Assuming that all contacts $L_1$ to $L_{16}$ would be closed and that in each group of relays only one would be operated, e. g. A$ar$ and B$ar$, then, in order to prevent all other relays from operating, batteries should be so connected that the ground potential connected at all of the contacts $L_1$ to $L_{16}$ except one, is absorbed in the fifteen corresponding resistances. The current flowing through fifteen resistances has therefore to be furnished through a total of six rectifiers, which are connected to make contacts A$a_1$ and B$a_1$ respectively, and each of these rectifiers, therefore, has to carry a current two and a half times larger than in the case of Fig. 1. This fact assumes particular importance when the number of electrical circuits becomes higher. For example, in case there are 100 electrical circuits to be distinguished this may be done by three groups of relays comprising 5, 5 and 4 relays respectively. The make contacts of each relay of the first two groups would be connected to four rectifiers each to shunt the four other relays of the group. The make contact of the relays of the third group would be connected to three rectifiers each to shunt the three other relays of the group. Therefore, for any combination of relays operated, having one operated relay in each group, a total of 4+4+3=11 rectifiers would be used to prevent all other relays from energising. Assuming now that all 100 circuits would close their contacts simultaneously, then the current through 99 resistances would have to be furnished through these eleven rectifiers, which would amount to a current nine times higher than required with the arrangement shown by Fig. 1.

When using Fig. 2, therefore, it is necessary to use large size rectifiers which are capable of carrying this current. The rectifiers connected in Fig. 2 directly to the resistances $R_1$ and $R_{16}$ may be of smaller size, because the maximum current they need to carry is that which flows through one resistance only. The value of the resistance is determined principally by the size of rectifiers that are connected to them. In practice it has been found possible to operate the circuit according to Fig. 2 employing rectifiers connected directly to the resistances with a current carrying capacity of maximum 10 ma. This determines the value of the resistance, since this must be so high that when practically the full battery potential has to be absorbed by this resistance in series with a rectifier, the current does not exceed 10 ma. Accordingly with a 48-v. battery potential, the value of resistances $R_1$ and $R_{16}$ may be fixed at approximately 5000 w. It, therefore, becomes necessary to use for the relays operating in series with these resistances, a rather sensitive type of which several may operate in parallel via a single resistance of 5000 w. For example, in the case mentioned above, where 100 different electrical circuits have to be distinguished, three of these relays in parallel must be capable of operating in series with a common resistance of 5000 w. Another requirement for these relays is that they have no follow contact. It has namely been found that by using relays providing a single rigid make contact without follow, the time during which more than one relay may be operated in a group is very considerably reduced, compared with relays having follow contacts. This may be explained as follows:

Assuming that two or more relays in a group would be operated simultaneously, all of these relays would be short-circuited by one another and would tend to release. It may now be assumed that the relays release successively with very short intervals. So long as two or more relays hold their make contacts closed, all relays remain short circuited. At the moment the last but one relay opens its make contact, the last relay remaining operated will immediately receive the full operating current again. When now this relay has no follow contact, its armature at this moment cannot yet be in motion and accordingly, by receiving the full current, it will hold its contact closed definitely without moving. If it were assumed, however, that these relays were provided with a follow contact, the armature of the relay holding its contact closed last, at the time the last but one contact opens, might already be moving backwards before its contact opens and in this case the inertia of the armature will tend to let this backward movement continue for a moment, even whilst the current is already re-closed through the winding. In consequence of this, the contact of the last operated relay might also open, permitting all other relays to receive current again and it will easily be seen that in this way the period during which relays may operate and release in rapid succession, may continue for a longer time than in the case the contacts are provided with a rigid make contact. It has actually been found by tests that relays having sufficient sensitivity to operate with the currents prevailing in the circuit and provided with a rigid make contact, would reduce this period to something of the order of 5 ms. and none of the relays except that remaining operated definitely would be able to energize its auxiliary relay during this period.

Figure 3:
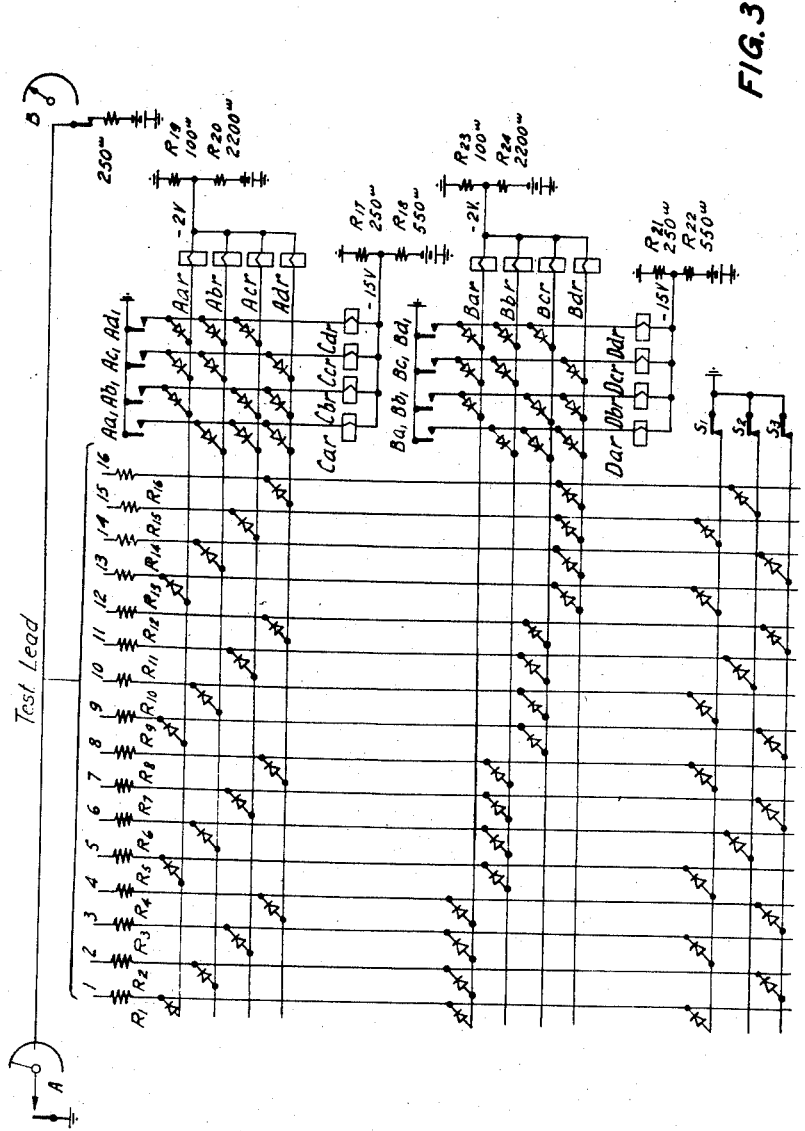
Fig. 3 shows an embodiment similar to the one shown in Fig. 2 used in telecommunication exchange systems to signal the busy and free condition of test leads and in which said test leads are sub-divided in groups, with means to select the group in which the test lead must be tested and identified.

Fig. 3 is similar to Fig. 2. The electrical circuits in this figure are constituted by test leads such as are employed in telecommunication exchange systems to signal the busy or free condition of one selector in a selector stage (e. g. that indicated by B on the drawing) to the selectors of the preceding selector stage (e. e. that indicated by A on the drawing).

When a selector in stage B is free, negative potential will prevail on the test lead connected to the multiples of the selectors in stage A. When a selector in stage B is engaged by a selector in stage A, the latter will connect ground potential to the test lead. Each of the test leads is connected according to the drawing, to one of the resistances $R_1$ to $R_{16}$, although it should be mentioned that the number of these resistances should be equal to the number of test leads connected in a group of selectors. Since battery potential is used to indicate the free condition of a selector in stage B, this battery potential will be used in order to operate a combination of relays via the rectifier matrix. It should be understood that the selectors of stage B may be divided into a number of different groups and that the object of the circuit is to select a free circuit of one of these groups. For this purpose the circuit shows in addition to the rectifier matrices, already represented in Fig. 2, another array of matrices connected to contacts $S_1$, $S_2$, $S_3$, which normally connect a ground via these rectifiers to all of the resistances $R_1$ to $R_{16}$. Owing to this, none of the relays is able to operate, in spite of the presence of free test potentials, so long as all contacts $S_1$ to $S_3$ are closed. In order to effect the selection of a free circuit from a predetermined group, one of these contacts, corresponding to the wanted group, is opened, so that thereby the short circuit on a number of relays is removed. It should be understood that the total number of test leads connected in selector stage A may be divided arbitrarily in any different number of groups and that each group may comprise any number of circuits within the total capacity provided by the selector arcs at stage A.

The drawing shows arbitrarily that seven out of the sixteen circuits are associated with group 1 and are controlled by contact $S_1$, three of the circuits are associated with group 2 and are controlled by contact $S_2$ and the remaining six circuits constitute group 3 and are controlled by contact $S_3$. The manner in which the different circuits are divided is completely arbitrary. Assuming that contact $S_1$ opens, the test leads from which this contact removes the ground, may now try to operate a combination of relays and one of these will be successful and cause the relays to operate in a combination indicating this successful circuit. It will be evident that only free circuits on which test potential is present will be able to cause the relays to operate and it is also evident that none of the circuits except one of the selected group is able to do so. The combination of relays operated may now be used to direct a selector in stage A to a corresponding set of terminals to which the selected test lead and the corresponding selector in stage B are connected.

On Fig. 4, by way of example, four register circuits $Rg1$ to $Rg4$ are represented, each of which must have access to a common translator CT. Only one register at a time may be connected to the translator and anyone register that is connected must prevent the others from effecting connection with the translator.

Further, if two or more registers would try to seize the translator simultaneously, only one of these may be connected and the others must be made to wait until the register that seized the translator first, releases it again.

Fig. 4 shows the manner in which the interconnection between four registers and a common translator is realised according to the invention. At the left-hand side of the figure a part of each of the four registers is represented and at the right-hand side a part of the common translator is indicated. The apparatus and connections of circuit Lo shown between the registers and the translator constitute the lock-out connecting equipment. The purpose of this connecting equipment is to establish a connection between a number of conductors at the register and a corresponding number of conductors at the translator. In each of the registers three of these conductors $a$, $b$ and $c$ have been shown by way of example, and these conductors may be connected for one register at a time to the conductors $a'$, $b'$ and $c'$ respectively at the translator. The fact that the register wants to obtain connection with the translator is indicated by the closure of the contact C which, for the four registers have been denominated $C_1$ to $C_4$. For each of the registers the connecting equipment comprises a relay and a resistance, which for the four registers have been denominated $Ar$ to $Dr$ and $R_1$ to $R_4$. Three contacts on each of these relays establish the required connections between the conductors $a$, $b$ and $c$ at the register concerned, and the conductors $a'$, $b'$ and $c'$ at the translator. Another contact is provided on each of the four relays to function in conjunction with a rectifier matrix which has the purpose of permitting only one single relay to operate at a time.

The operation of the circuit is as follows:

Assuming that register $Rg1$ wants to obtain connection with the common translator, contact $C_1$ will close and connect ground through resistance $R_1$ and the winding of $Ar$ to battery, so that $Ar$ operates and thereby establishes on its contacts 2, 3 and 4 the required connections between the register and the translator. Contact No. 1 on relay $Ar$ connects battery to the first of four vertical leads forming part of the rectifier matrix and thereby battery is connected via one rectifier each to the windings of relays $Br$, $Cr$ and $Dr$. If now during the time relay $Ar$ is operated any of the other registers, e. g. register $Rg2$ would try to obtain connection with the translator, the corresponding relay, e. g. $Br$, would not be able to operate because by the closure of contact $C_2$ a circuit would be closed from ground through resistance $R_2$, and the rectifier leading to the first vertical lead, to battery at make contact No. 1 of $Ar$. The rectifier in this case presents a low resistance and effectively shunts the winding of relay $Br$, so that this is unable to operate. It will operate instantly the moment the register $Rg1$ releases the translator by opening its contact $C_1$, which de-energizes $Ar$, thereby removing the shunting battery from the first vertical lead.

Assuming that two or more registers would close their contacts C simultaneously, all of the corresponding connecting relays would attempt to operate simultaneously. That relay which operates first and closes its contact No. 1 will shunt out all others and prevent these from operating. In practice it may occur that two or more relays have practically the same operating time, so that they will more or less simultaneously close their contact No. 1. It will be seen that as soon as more than one relay is operated, all relay windings without exception are shunted, and therefore, all relays that were operated will commence to release again. For example, assuming that registers $Rg1$ and $Rg2$ simultaneously close their contacts $C_1$ and $C_2$ respectively, and that relays $Ar$ and $Br$ succeed in operating and in closing their contact No. 1 at approximately the same time, battery is connected to the first vertical lead from make contact No. 1 of $Ar$, thereby putting a shunt on relays $Br$, $Cr$ and $Dr$, whereas at the same time battery is connected to the second vertical lead from make contact No. 1 of relay $Br$, which thereby shunts the windings of relays $Ar$, $Cr$ and $Dr$. All relays are thus shunted and both $Ar$ and $Br$ will start to release. The relay which opens its make contact first, permits current to flow in the other relay which, by keeping its make contact closed, maintains the short circuit across the winding of the relay that opened its make contact. Tests have shown that when an attempt is made to operate a large number of relays simultaneously, there may be a few moments during which one or more of the relays rapidly open and close their make contact, until finally one of them succeeds in holding definitely and causes all others to release definitely.

It will be seen that in this circuit there is no preference given to any one of the relays and that the operating circuit for each relay is closed independent of all others, without the intervention of break contacts.

Fig. 5 shows the same arrangement as Fig. 4, but in this figure certain conventions have been used which will be employed in all further figures of the description. These conventions have the purpose of permitting the simplification of the drawing and have particularly in view to provide the possibility of representing several circuits by one single circuit only. It will be seen that Fig. 5 shows only one of the four registers, which is typical for all of them, and that instead of showing all leads by which the register and the translator have to be interconnected, only a single lead is shown. Further, the contacts numbered 2 to 4 on the different connecting relays A$r$ to D$r$ are represented by a single contact only. It will further be noticed that the connecting equipment, which in Fig. 4 was shown separate from both registers and translators, is now represented as forming part of the translator. It is believed that by comparing Figs. 4 and 5, the significance of these conventions may easily be understood.

Figure 6:
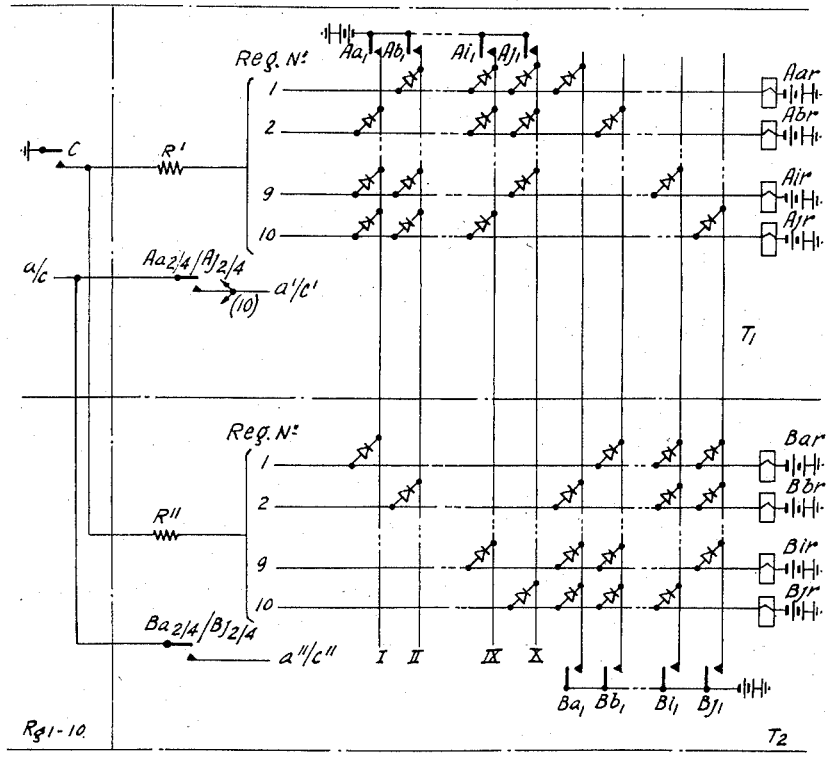
Fig. 6 shows a similar arrangement to the one of Fig. 5, but assuming the case that a larger number of registers, e. g. ten are given access to a plurality of common translators, e. g. two.

Fig. 6 shows a similar arrangement to Fig. 5, but assuming the case that a larger number of registers, e. g. ten, are given access to a plurality of common translators, e. g. two (T1 and T2).

In order to render it clear how it is possible to provide a lock-out arrangement in this case, Fig. 6 shows the connections to be provided for both translators, whereas of the ten registers only one typical circuit is represented.

Figure 7:
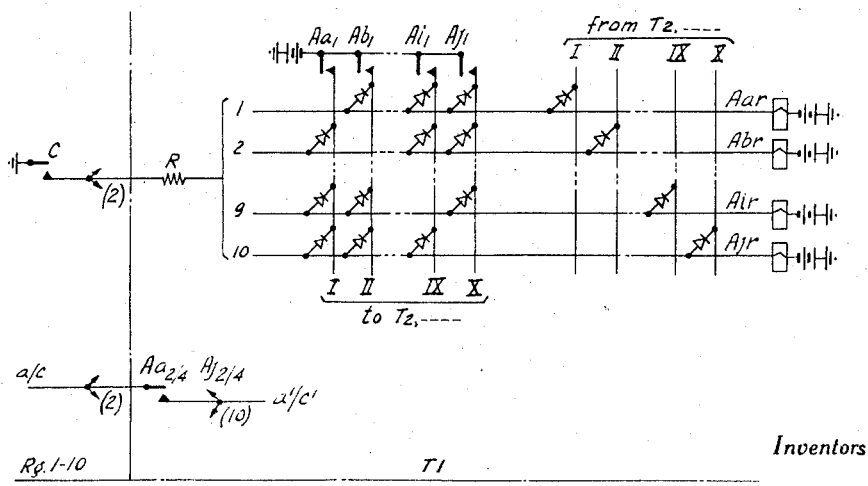
Fig. 7 represents the same arrangement as in Fig. 6, but here again the conventions are employed as described above with reference to Fig. 5.

Fig. 7 represents the same arrangement as Fig. 6, but here again the conventions are employed as described above with reference to Fig. 5, so that here only one of the two translators is represented.

Referring to Fig. 6, the operation will be as follows:

In the first place it should be observed that each of the two translators has its own connecting relays, one of which is associated with each of the ten registers and these relays have been denominated A$ar$ to A$jr$ for the first translator and B$ar$ to B$jr$ for the second translator in Fig. 6. When adopting the conventions as shown in Fig. 7, where only a single translator is shown, it will be evident that the relays in different translators will have the same denomination. The different denomination shown in Fig. 6 has been adopted only in order to avoid confusion in the description.

Assuming now that one of the registers wants to obtain access to a translator, it closes its contact C and will thereby establish two parallel circuits for the corresponding connecting relays in both translators. For example, when register R$g$1 calls for a translator, a circuit will be closed from ground at contact C therein, on one hand via resistance R' and via the corresponding horizontal lead No. 1 of the rectifier matrix to the winding of A$ar$ and to battery, and on the other hand via resistance R" and the corresponding horizontal lead No. 1 of the rectifier matrix to the winding of relay B$ar$ and to battery. If both translators are assumed to be free, both of these relays will attempt to operate. That which operates first will close its make contact and thereby connect battery to one of the vertical leads of the rectifier matrix. As may be seen, relay A$ar$ when operating in translator T1, connects battery at contact A$a_1$ to the vertical lead denominated by the symbol I leading towards translator T2 and when relay B$ar$ operates in translator T2 it closes battery at its contact B$a_1$ to the vertical lead denominated by XI leading towards translator T1. The battery at make contact A$a_1$ will be connected through a rectifier to the horizontal wire leading to the winding of relay B$ar$, which is thereby shunted out. On the other hand, the battery connected at make contact B$a_1$ will be connected via a rectifier to the horizontal wire leading to the winding of A$ar$ and causes this to be shunted out.

From what has been said above, it will now be evident that only one of the two relays involved will be able to remain operated, whereas the other will remain de-energized. The operated relay will connect the register to the corresponding translator by means of its contacts Nos. 2 to 4. Assuming that translator T1 is connected, relay A$ar$ will have operated and, as already described, will thereby have prevented the operation of relay B$ar$. At the same time, the battery at make contact A$a_1$ is connected via other rectifiers to the windings of all other connecting relays forming part of translator T1.

The result of this arrangement is that when a second register would now attempt to engage a translator, the connecting relays A$br$ to A$jr$ associated with translator T1 will all be shunted by direct battery at make contact A$a_1$ provided through one rectifier each, and therefore none of these relays will be able to operate when a second register closes its contact C. For example, when register R$g$2 closes its contact C, ground will be connected through the two resistances R' and R" to the horizontal wires numbered 2 for each of the two translators. This ground is ineffective at translator T1, as it meets battery through a rectifier connected thereto from make contact A$a_1$. The ground connected through resistance R" will, however, be able to operate B$br$ because no battery is connected to the horizontal wire No. 2 in translator T2 from make contact A$a_1$. Accordingly relay B$br$ operates and connects register R$g$2 to translator T2. Battery is now connected via make contact B$b_1$ to the vertical lead denominated XII and this has a similar effect as described in connection with the operation of relay A$ar$, i. e. it prevents all other connecting relays of translator T2 from operating (by connecting battery thereto through a rectifier) if now a further register would try to engage a translator.

From the above it will be seen that the operation of anyone connecting relay associated with a translator, in order to connect one of the registers thereto, prevents any of the other connecting relays associated with the same translator from operating if further registers would call for a translator. In other words, the operation of a single connecting relay renders the translator busy for other calls. At the same time the operation of a connecting relay in one translator prevents the operation of the corresponding connecting relay in the other translator, which prevents a register from being connected to more than one translator at a time. However, the circuit permits anyone register to be connected to one translator and any other register to be connected to the second translator.

Referring to Fig. 7, which as stated above, represents the same arrangement as Fig. 3, it will be seen that only the equipment for one single translator is represented and that the rectifier matrix is divided into two parts. On the left-hand side is shown the part of the matrix by which only one connecting relay can be made to operate at a time in each translator. On the right-hand side the part of the matrix is represented which prevents any connecting relay of a translator from operating when the corresponding register is connected to the other translator.

It should be observed that the drawing as represented in Fig. 7 permits of reading the circuit also in such a manner that more than two translators would be provided. Evidently in this case the connections from each of the registers should be branched off in parallel to more than two translators and the figure "2" shown in brackets near these connecting points should be disregarded. Further, the right-hand part of the matrix should be repeated for every translator added, i. e. in case there would be three translators the right-hand part of the matrix would be repeated twice, once for every other translator; if there would be four translators the right-hand part of the matrix would be repeated three times, etc. in every case once for every other translator than that represented.

Figs. 8 to 12 represent a number of improvements to the scheme as represented by preceding figures without changing anything to the principles thereof.

Figure 8:
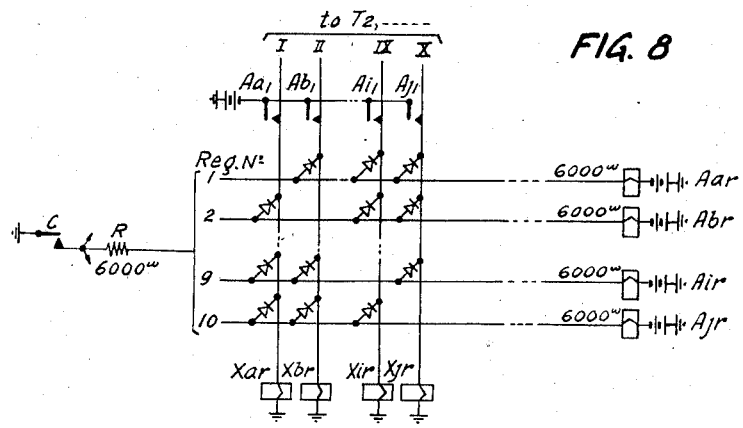
Fig. 8 shows an arrangement similar to the one shown in Fig. 7 in which the lock-out contacts of the connecting relays are used to operate auxiliary relays.

In the first place, Fig. 8 shows the connecting relays and the left-hand part of the matrix in the same way as represented in Fig. 7, but in addition it shows that each of make contacts $Aa_1$ to $Aj_1$ is used to operate one of the auxiliary relays $Xar$ to $Xjr$. In this manner the relays $Aar$ to $Ajr$ can be made so as to carry one single make contact only, whereas the contacts required to effect interconnection of the registers and the translators may be provided on the corresponding auxiliary relay. These latter make contacts have not been represented on Fig. 8. The advantage of providing only a single make contact on relays $Aar$ to $Ajr$ resides in the fact that thereby it becomes possible to use for these a type of relay which has been found to be particularly suitable for this purpose. It has already been explained hereinbefore that in order to reduce or even completely eliminate the rapid operation and de-energization of these relays in case two or more of them would attempt to operate simultaneously, it is advantageous to use a relay closing a contact having no follow, but on which a rigid contact is provided. This type of contact is usually provided on relays of which the armature itself acts as a contacting member. By this fact, however, such relays usually carry only a single make contact. The use of this type of relay is advantageous also from another point of view, viz: that the construction referred to here permits the relays to work with a very small amount of energy. This has a practical value, because it thereby becomes possible to choose for the resistance R which is connected in series with the relays $Aar$ to $Ajr$, a rather high value, which thereby limits the amount of current that has to pass through the rectifiers in case these have to exercise a shunting function on the relay. This in turn leads to the possibility of using rectifier discs of miniature size permitting to carry a very limited amount of current only. In practice it has been found possible to use rectifiers which could carry a maximum of 10 ma. continuously and, on the assumption that a 48 v. battery potential is used, it thereby became possible to take for resistance R a value of 6000 w., which would limit the current in the rectifiers to 8 ma. at a battery potential of 48 v.

In the case of Fig. 8, relays $Aar$ and $Ajr$ have been given also a resistance of 6000 w., because in so doing the maximum energy is available for the relay when connected in series with a resistance of 6000 w.

In the case of Fig. 8, relays $Aar$ and $Ajr$ have been given also a resistance of 6000 w., because in so doing the maximum energy is available for the relay when connected in series with a resistance of 6000 w.

It will be noticed that by the fact that relays $Xar$ to $Xjr$ are connected directly to ground, the full battery potential of 48 v. will be connected to all rectifiers when the circuit is in the normal condition, i. e. with none of the relays operated. This leads to the necessity of providing a number of rectifier cells in series sufficient to withstand the permanent 48 v. potential in the non-conducting direction. With commercial rectifiers, which may withstand permanently a potential of 12 to 16 v. per cell only, it thereby becomes necessary to use four cells in series for each of the rectifiers shown.

Figure 9:
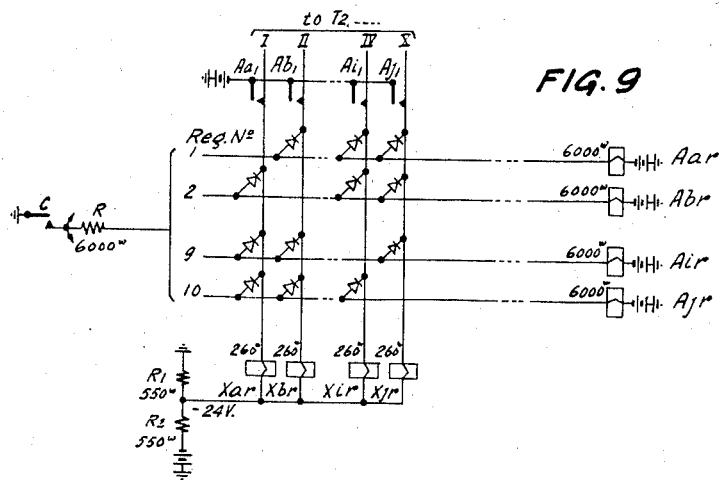
Fig. 9 shows a modification of the arrangement of Fig. 8, in which one of the winding terminals of each auxiliary relay is connected to a common intermediate point of a potentiometer.

Fig. 9 shows an arrangement whereby it is possible to reduce the number of rectifier cells, for each of the rectifiers shown, one or two. To this purpose the relays $Xar$ to $Xjr$ are not connected to direct ground but are connected to the midpoint of a potential divider consisting of resistances $R_1$ and $R_2$ having equal value, so that normally a potential of −24 v. is connected to the winding of relay $Xar$ to $Xjr$. The result is that the rectifiers are now exposed in the normal condition, with none of the relays operated, to a potential of 24 v. only, so that two rectifier cells will suffice. With this arrangement, a practical resistance for the relays $Xar$ to $Xjr$ has been found to be 260 w. With this resistance, when a circuit is closed from battery through the winding of one of these relays, the potential at the midpoint of the potential divider changes to approximately −36 v. This means that in the operated condition of one of the connecting relays, the potential across the rectifiers connected to those of the relays $Aar$ to $Ajr$ that are not operated, will be reduced to 12 v. From this it may be seen that two rectifier cells are in any case sufficient with the above potential divider.

Even with the use of only two cells per rectifier, the shunting effect is not quite perfect, owing to the finite resistance of a rectifier in the conducting direction. This resistance produces a certain potential across the winding of a shunted relay which is not although negligible. It may be assumed that when a rectifier carries a current approaching the maximum value it may carry, this resistance will cause a drop of potential of between 1 and 2 v. per cell. Thus, with the use of two cells per rectifier, there will be a drop of potential across a rectifier of between 2 and 4 v. when this rectifier has to shunt out one of the relays $Aar$ to $Ajr$. The result of this is that these latter relays have to be so designed that they are able to release safely on this potential. On the other hand these relays have to hold safely on the potential of 12 v. which has been referred to above, since the horizontal wire leading to an operated relay $Aar$ to $Ajr$ will approximately assume the same potential as existing at the midpoint of the potential divider, owing to the path which is provided through all of the rectifiers connected to this horizontal wire and through the non-operated relays $Xar$ to $Xjr$. The arrangement according to Fig. 9 calls for a relay of which the release current is a very high portion of the current which it receives in the circuit for holding, unless the operating conditions are improved for relays $Aar$ to $Ajr$ in this respect. For this purpose another embodiment has been shown in Fig. 10 in which the windings of the relays $Aar$ to $Ajr$ are not connected to the full 48 v. potential, but are connected to the midpoint of a potential divider $R_3$ and $R_4$, which connects to these relays a potential of approximately −46 v. At the same time, the potential divider comprising resistances $R_1$ and $R_2$ has so been changed as to provide a potential to relays $Xar$ to $Xjr$ of −33 v. The result of this is that the maximum potential to which the rectifiers are now subjected is 13 v. only, which permits the use of a single rectifier cell for each rectifier shown. As a consequence, the drop of potential across these rectifiers will not exceed 2 v.

It will now be seen that with a drop of potential of 2 v. across a rectifier, the potential on the horizontal wire to which this rectifier is connected, will be −46 v., which is equal to the potential to which the other side of the winding of relays $Aar$ to $Ajr$ is connected. In consequence of this, the rectifier will not now permit any current to flow through the shunted relay, so that no release prescription is necessary for these relays. If the drop of potential across a rectifier would be less than the maximum of 2 v., the result is that a small amount of current would be caused to flow through the corresponding relay $Aar$ to $Ajr$ in the direction opposite to normal. This has a further beneficial effect on the manner in which these relays function. This may be explained as follows:

Assuming that in Fig. 10 registers 1 and 2 simultaneously close their contact C, so that relays $Aar$ and $Abr$ attempt to operate simultaneously. It may now be assumed that both of these relays close their contacts $Aa_1$ and $Ab_1$ respectively, at the same time, so that currents are closed on one hand from ground at register No. 1 through resistance R, the rectifier connected to horizontal wire No. 1 and make contact $Ab_1$ to battery, and on the other hand a circuit is closed from ground at register No. 2 through resistance R, horizontal wire No. 2 and one of the rectifiers connected thereto, to battery at make contact $Aa_1$. Owing to this, a drop of potential will be caused in both rectifiers referred to, which cause wires 1 and 2 to assume a potential of say —47 v. when the drop of potential in the rectifiers is assumed to be 1 v. Accordingly the current in both relays Aar and Abr will now be reversed because the wires 1 and 2 now become negative with respect to the potential of —46 v. provided at potential divider $R_3$, $R_4$. The result is that these relays will tend to release quicker than by a short circuit, so that the period during which they close their make contact is reduced to a few milliseconds. By a proper design of relays and potential values, it has been found in practice that these relays could be made to finish any vibrating action in maximum 5 milliseconds and during this time none of their auxiliary relays would be able to operate. The result of this is that even in case many calls would enter simultaneously, only one of the auxiliary relays would operate and none of the others would even attempt to close its contacts for establishing the connection between the corresponding register and translator.

Another result of the arrangement as shown in Fig. 10 is that relays Aar to Ajr can be so made that they do not require to release on rather a high false current, which permits these relays to be designed so that they operate with less energy. Owing to this it was found possible to reduce the resistance of their winding very considerably, which in turn reduces the potential applied to the rectifiers connected to an operated relay.

In practice it has been found possible to design a relay with a resistance of 1200 w. in the circuit conditions as shown in Fig. 10. Another result of this is that the potential prevailing on the horizontal wire via which one of relays Aar to Ajr is operated, is negative with respect to the potential existing at the midpoint of potential divider $R_1$, $R_2$, so that all rectifiers connected to the horizontal wire of an operated relay Aar to Ajr will be polarized in the non-conducting direction and thereby will not act as shunts on the winding of the operated relay Aar to Ajr.

Fig. 11 represents an alternative arrangement in which the registers are connected to the common translators through two successive stages of connecting equipment. Each of these stages will work in the manner described in connection with Figs. 8 and 10. The drawing represents the case that there are five groups of 10 registers (Rg) each, and that each group of 10 registers has access through a first stage of connecting relays to two links (LK). For a total of 50 registers there will be, therefore, 5×2=10 links and the 10 links serving these 50 registers, via a second stage of connecting equipment provide access to four common translators CT. As any link may be connected to any of the four translators, each register has the possibility via two different links to obtain access to any of the four translators.

The links, in principle, comprise only the connecting equipment such as shown by Figs. 8 and 10. In addition, they must contain a contact similar to contact C provided at the registers, in order to start the operation of the second stage of connecting equipment. Such a contact C is provided by means of a relay which operates whenever any of the connecting relays Xar, etc., of Fig. 10 will energize. A convenient manner to provide this relay, without requiring contacts on the connecting relays Xar, etc., is to provide the potential divider $R_1$, $R_2$ in the shape of a relay such as shown by Fig. 12. The relay Cbr in Fig. 12 replaces the potential divider $R_1$, $R_2$ of Fig. 10. The two windings of this relay have an approximately equal number of turns and are connected in opposition, so that normally no flux is created in this relay so long as none of the relays Bar, etc. is made to operate. With current flowing through one of these relays, the currents in the two windings of Cbr become different, creating a sufficient flux to cause the relay to energize and to close a contact which may act for starting the second stage of connecting equipment via terminal A.

On the basis of the principles as disclosed in Figs. 1 to 12, some further developments have now been made which are represented by Figs. 13 to 17 and Figs. 18 to 21, 23 and 24 respectively.

Figs. 13 to 17 represent in diagrammatic form different cases in which relay connecting equipments may be employed, whereas Figs. 18 to 21, 23 and 24 show the corresponding circuit.

Figure 13:
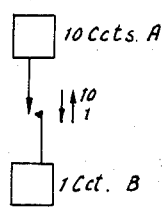
Fig. 13 shows in block diagram the application of relay connecting and lock-out equipment to the interconnection of circuits belonging to two different groups of circuits, in such a manner that a circuit of either group may call for a circuit of the other group to be connected to it one of the groups comprising only one circuit.

Fig. 13 shows the case that there are two groups of circuits interconnected by relay equipment, in such a manner that a circuit of either group may call for a circuit of the other group to be connected to it. In a particular example, ten circuits in group A have access to one circuit in group B and two possibilities are provided, the first being that any of circuits A may call for circuit B in such a manner that only one of circuits A may be connected to B at a time, and the second being that circuit B calls for the connection of any free circuit A, as a result of which one of these circuits is connected to it.

According to the invention, the same relay connecting equipment serves in both cases to obtain the required connection.

The arrows shown in the figure near the symbols representing the connecting equipment, indicate this bothway operation and the figures near the arrows represent the number of circuits that are interconnected at each side of the connecting equipment.

Figure 14:
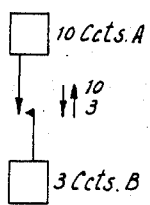
Fig. 14 shows in block diagram an arrangement similar to the one of Fig. 13 but in which both groups comprise a plurality of circuits.

Fig. 14 shows a similar case, but in which a plurality of circuits are present in each of the two groups, in such a manner that any free circuit of one group may be connected to any calling circuit of the other group. The same relay equipment again serves here for this bothway action and the example shows that ten circuits A and three circuits B may be interconnected.

Figure 15:
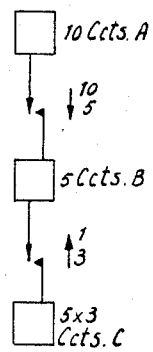
Fig. 15 shows in block diagram an arrangement with three groups of circuits interconnected by two stages of connecting equipment in which circuits of the second group may be seized either from a circuit of the first group or from a circuit of the third group.

Fig. 15 shows a case where three stages of circuits A, B and C are interconnected by two connecting equipments, in such a way, that the circuits of group B may be seized either from group A or from group C. It is assumed in this picture that the ten circuits A have access to all five circuits B and that each of the circuits B is accessible to a sub-group of three circuits C, so that the total number of circuits C is 5×3=15.

The arrows near the connecting equipments indicate the direction of operation and the number of circuits inter-connected.

Figure 16:
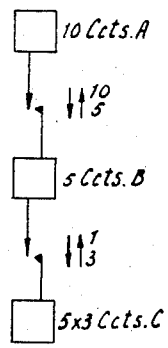
Fig. 16 shows in block diagram a similar arrangement to the one of Fig. 15 with both-way operation in the two stages of connecting equipment.

Fig. 16 shows a similar case as Fig. 15, but with bothway operation in the two stages of connecting equipment. In other words, any of the 10 circuits A may seize anyone free circuit of the group of five circuits B, whereas each circuit B is accessible to a sub-group of three circuits C. On top of this, circuit B may attempt to engage any free circuit A and any of the sub-group of three circuits C to which it may be connected.

It will be evident that, if use has to be made of the same connecting relays for both directions of operation, a particular problem presents itself with this case, because the requirement must be met that any of the circuits B, whenever becoming engaged by a circuit A or C respectively, must test busy to either circuits A or C, yet it should be in a position to engage any of the free circuits C or A respectively. For example, assuming one of the circuits B has been engaged from a circuit C, this circuit B must be able to call for a free circuit A, whereas at the same time it may happen that one or more of the circuits A to which it has access tries to obtain access to a free circuit B. Under these conditions, the circuits A that are in a calling condition must not be seized by the circuit B under discussion and at the same time this circuit B must test busy for the circuits A that are in the calling condition.

Fig. 14 shows a case similar to that represented by Fig. 16, but with four stages of circuits A, B, C and D, interconnected by three stages of connecting equipment which may serve for calls in the two directions of operation, i. e. calls may originate at a circuit A and successively engage a circuit B, C and D, and other calls may originate at a circuit D and successively engage a circuit C, B and A. All this may take place by the same interconnecting equipment without interfering between the calls in the two directions.

Referring now to Fig. 18, this represents the simple case of bothway operation represented by Fig. 13. One of each of the circuits A and B has been represented and the connecting equipment is supposed to form part of the circuit B.

Calls originated at circuit A are characterised by the fact that in the calling circuit A a changeover contact CB is operated by means not further shown on the drawing. With CB operated, a circuit from ground will be closed by make contact CB, via break contact CA, resistance R and next to the horizontal wire corresponding to the circuit A in question and via the winding of one of the relays A$ar$ to A$jr$ to —46 v. potential at potential divider R$_3$, R$_4$. The operated relay operates its auxiliary relay X$ar$ to X$jr$ and at the same time locks out the other relays of group A$ar$ to A$jr$, thereby preventing any of the other circuits B, if subsequently contact CB at a different circuit A would operate.

Calls originated at circuit B are characterised by the fact that a number of contacts CA, equal to the number of circuits A, is operated simultaneously at circuit B. At each of the make contacts of these contacts CA, a circuit may be closed via an associated contact CB, if this is in the normal condition, from ground at break contact CB, make contact CA, etc. to the horizontal wire corresponding to each of the circuits A. Accordingly, all of the relays of the group A$ar$ to A$jr$ corresponding to free circuits A, will attempt to operate, but by means of the rectifier matrix all of these relays except one is locked out, so that finally only one of the auxiliary relays X$ar$ to X$jr$ is made to operate and to effect connection between circuit B and one of the circuits A.

Assuming that one or more circuits A would be in the calling condition at the same time as circuit B, these calling circuits A would not be able to complete the circuit for their corresponding relay in the group A$ar$ to A$jr$, because this circuit would be opened at the corresponding break contact CA. This means that calls from circuit B are given preference over calls from circuit A. On the other hand, circuit B when in the calling condition, is not able to obtain connection with any circuit A which itself is in the calling condition, because the circuit for the corresponding relays in the group A$ar$ to A$jr$ is opened in this case at the break contact CB of the calling circuit A. Accordingly, circuit B when in the calling condition is able to connect itself only with one of the free circuits A that is not in the calling condition.

Fig. 19 is similar to Fig. 18 except that a plurality of circuits B is represented. This means that both the make and the break contacts of the changeover contact CB of each circuit A are connected to the corresponding contact CA in each of the circuits B provided.

It follows from this also, that the conductors $a/n$ of each of the circuits A will be connected each via a contact of a plurality of connecting relays each to the corresponding circuit B.

A call originating at a circuit A will, therefore, connect ground via a resistance R to the corresponding horizontal wire in each of the circuits B which are not in the calling condition.

Lock-out circuits have been provided so that, on one hand an operated relay of the group A$ar$ to A$jr$ locks out all other relays of this group in the same circuit B, so that thereby only a single circuit A may be connected at a time to a circuit B, on the other hand lock-out circuits are provided between the equally named relays of the group A$ar$ to A$jr$ in the different circuits B, so that only one of these relays may energise, thereby ensuring that a circuit A will be engaged with only one circuit B at a time.

A call originating at a circuit B may engage any of the circuits A that are not in the calling condition in the same way as described in connection with Fig. 18.

It is evident that in this case also, as soon as a circuit B has obtained access to a circuit A, the lockout circuits provided at the same time ensure that the circuit B can be connected to only one circuit A at a time, and on the other hand that none of the other circuits B may obtain access to the circuit A which had been engaged.

It will be evident from the above that if at any time one or more circuits A and one or more circuits B would be in the calling condition simultaneously, each of the calling circuits A can become connected to one of the circuits B that are not in the calling condition, whereas each of the calling circuits B also can become connected to only one of the circuits A that is not in the calling condition.

Figure 20:
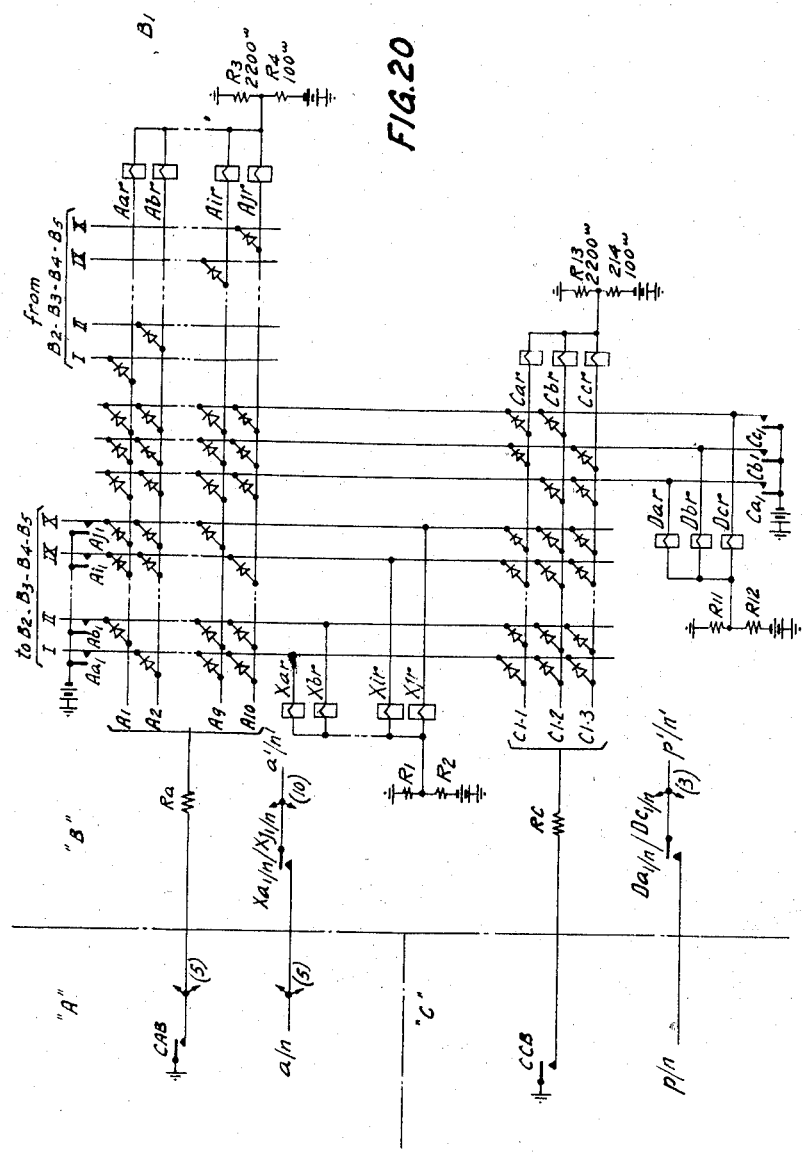

Referring now to Fig. 20 an arrangement is shown, in which e. g. each of a group of five circuits B may be seized either from any of a group of ten circuits A and from a group of three circuits C, in such a way that the ten circuits A have access to all five circuits B, but that there are five separate groups of circuits C each having access to one of the circuits B.

Again, as in the preceding figures, the drawing has been made up in such a way that only one of each of the different types of circuits is represented.

Since each of the circuits B is associated with a subgroup of three circuits C, B1 is associated with circuits C1–1, C1–2, C1–3, B2 with circuits C2–1, C2–2, C2–3 . . ., and therefore since only circuit B1 is shown on Fig. 20 only the connecting equipment to circuits C1–1, C1–2, C1–3 is shown. The same applies also for Figs. 21, 23, 24 described further on.

The problem to be dealt with in this case is that because a circuit B may be engaged from two different directions, arrangements must be made so that in case of an attempt to seize a circuit B from the two directions simultaneously, it can be connected to only one calling circuit of either one or the other direction. This is arranged for as follows:

As may be seen, a group of access relays A$ar$ to A$jr$ is provided for each circuit B, each of these relays corresponding to one of the circuits A. These relays have auxiliary relays X$ar$ to X$jr$ by which the interconnection is provided between circuits A and B. These auxiliary relays operate from make contacts of the access relays which make contacts at the same time also serve to lock out one another in the manner already described.

Since each circuit A may obtain access to any circuit B, arrangements have also to be provided in the manner already described, to prevent a circuit A from obtaining connection with more than one circuit B at a time. This is brought about by means of the rectifiers that are connected between the make contacts of each of the access relays A$ar$ to A$jr$ of a circuit B and the winding of the equally named relays in all other circuits B. This is indicated by the part of the rectifier matrix shown nearest the windings of relays A$ar$ to A$jr$ in Fig. 20.

A further group of three access relays C$ar$ to C$cr$ is provided for each circuit B, each of these relays corresponding ot one circuit C that may obtain access to the circuit B under consideration. Also these access relays have auxiliary relays, D$ar$ to D$cr$, and lock out one another by means of their make contacts Ca$_1$ to Cc$_1$, and the part of the rectifier matrix shown nearest to the windings of relays C$ar$ to C$cr$.

It will now be seen that the two groups of access relays $Aar$ to $Ajr$ and $Car$ to $Ccr$ lock out one another mutually also, so that when any relay of one group is operated, all relays of the other group are prevented from energising. This is brought about by means of rectifiers connected between each make contact of the relays of one group and all relay windings of the other group.

When at any time a circuit A and a circuit C would call for a circuit B simultaneously, the circuit A would attempt to operate the access relay corresponding to it in each of the circuits B, and as already explained before, only one of these access relays would succeed in operating and energising its auxiliary relay, owing to the action of the rectifier matrix interconnecting the equally named relays in the different B circuits. The calling circuit C would attempt to operate the access relay corresponding to it in only one of the circuits B and this relay cannot be operated simultaneously with any of the access relays corresponding to the different circuits A. It will namely be seen, that any of the make contacts $Ca_1$ to $Cc_1$, via a rectifier, will short circuit all of the access relays $Aar$ to $Ajr$ and inversely each of the make contacts $Aa_1$ to $Aj_1$, via a rectifier, will short-circuit all of the access relays $Car$ to $Ccr$. The result of this will be that finally only one access relay will operate together with its auxiliary relay, either to connect a calling circuit A or the calling circuit C to circuit B. If the circuit C would be successful, the calling circuit A would have to connect itself to one of the other circuits B. If on the other hand the circuit A would be successful, the calling circuit C would have to wait until the only circuit B to which it has access, is again liberated.

Fig. 21 is similar to 20, except that the paths of access between the three groups of circuits will operate in two directions, so that a call originated at one of the circuits A will first of all engage a circuit B and this in turn will next engage a circuit C.

On the other hand, a call originated at one of the circuits C, will first of all engage the circuit B to which it has access, and this in turn will engage one of the circuits A. The problem to be dealt with in this case may be explained as follows:

Assuming that calls originate simultaneously at a circuit A and at a circuit C, arrangements should be made so that a circuit B can be seized from one direction only, as already explained in connection with Figs. 15 and 20. This means, that as soon as one of the access relays associated with the circuit B has operated, this should disable all remaining access relays. Still, in spite of this, a moment later the circuit B should attempt to engage a circuit of that group to which it is not yet connected, which means that in order to render this possible, the corresponding group of access relays should be given free for operation, without providing the possibility to operate these access relays for a call originated at that other group. The circuit operates as follows:

Assume the case of a call originating at one of circuits A, and which consequently has to engage one of the free circuits B and one of the free circuits C.

The calling condition of circuit A is indicated by bringing the calling contact CAB in the operated condition and this connects ground to all five circuits B via make contact CAB. For those circuits B that are in the normal condition this ground will be extended via one of the break contacts $E_{1-10}$ and a resistance $Ra$ to the horizontal lead corresponding to the calling circuit A. One of the access relays $Aar$ to $Ajr$ will operate correspondingly and on its make contact operate the auxiliary relay of the group $Xar$ to $Xjr$. The closure of the make contact of the operated access relay of the group $Aar$ to $Ajr$ provides lock outs in three ways:

In the first place, the operation of one of these relays immediately locks out all others of the same group, so that only one relay of the group can be operated at a time and only one of the circuits A may obtain access to each circuit B.

In the second place, a lock out is provided between the equally named relays of the different circuits B, so that the calling circuit A may be connected only to one of the circuits B at a time.

In the third place, a lock out is provided to prevent the operation of the access relays $Car$ to $Ccr$, so that it is thereby prevented that the circuit B which is engaged from the calling circuit A is subsequently seized from any of the circuits C. This lock out circuit is provided from the operated make contact of group $Aa_1$ to $Aj_1$ via one of break contacts $G_1$ to $_{10}$ and a group of three rectifiers connected to the windings of the access relays $Car$ to $Ccr$.

In order to render it possible to engage a free circuit C from the engaged circuit B, the access relays $Car$ to $Ccr$ should now be made available for interconnecting circuit B with a free circuit C in such a manner, that the circuit B in question cannot be engaged by any calling circuit C. This happens as follows:

A contact provided on each of the connecting relays $Xar$ to $Xjr$ is used to operate a relay $Dr$ via a break contact $E_{12}$. This relay $Dr$ carries three changeover contacts which are inserted in the circuits between the access relays $Car$ to $Ccr$ and the corresponding circuits C. By the operation of $Dr$, therefore, it is prevented that a calling circuit C operates the corresponding access relays $Car$ to $Ccr$, because the operating circuit for this relay would be opened at the corresponding break contact $D_{1-3}$. However, even with the contacts $D_{1-3}$ in the operated condition, the access relays $Car$ to $Ccr$ cannot yet operate via a break contact CCB at circuit C, because they are still being kept short-circuited from the contact of the operated access relay of the group $Aar$ to $Ajr$. As soon as relay $Dr$ has operated, it closes a circuit, at make contact $D_5$, for the operation of relay $Gr$ which opens its break contacts $G_1$ to $G_{13}$. By opening contacts $G_{1-10}$, the short-circuit on the access relays $Car$ to $Ccr$ is removed and these relays may now attempt to operate, in which attempt one will be successful, because this successful relay will definitely lock out the two others by connecting battery at its make contact $Ca_1$ to $Cc_1$ via rectifiers to the windings of the two other relays. By the fact that break contacts $G_{11-13}$ are now also open, the battery at make contact $Ca_1$ to $Cc_1$ is prevented from reaching the windings of the group of relays $Aar$ to $Ajr$, so that there are not affected by the operation of one of the groups of relays $Car$ to $Ccr$.

It will be clear that the auxiliary relay of group $Dar$ to $Dcr$ which is made to operate, will now establish the necessary connections between the circuit B under consideration and the engaged circuit C. This connecting relay carries also a contact from which a circuit leads via a break contact $D_4$ to the winding of a relay $Er$. Since relay $Dr$ was previously operated, relay $Er$ is not able to energise.

Taking now the case of a call originated at one of the circuits C, the calling condition at a circuit C is indicated by bringing the calling contact CCB in the operated condition, which will close a ground from the make contact of this contact via one of the break contacts $D_{1-3}$ (assuming that circuit B is free) and resistance $Rc$ to the horizontal lead corresponding to the calling circuit C.

One of the access relays $Car$ to $Ccr$ will operate and at its make contact $Ca_1$ to $Cc_1$ energises the connecting relays $Dar$ to $Dcr$. At the same time, on the closed make contact $Ca_1$ to $Cc_1$ two lock-out circuits are provided as follows:

In the first place, the operated relay of the group $Car$ to $Ccr$ will shunt out the two others of this group, so that only one circuit C at a time may obtain access to circuit B.

In the second place, the operated relay of the group

Car to Ccr shunts all access relays of the group Aar to Ajr, via one of break contacts $G_{11}$ to $G_{13}$, thereby preventing the circuit B that was engaged from circuit C, from becoming engaged with a calling circuit A.

Arrangements should now be provided to permit the operation of one of the access relays Aar to Ajr in order to establish a connection from circuit B with one of the free circuits A, without giving a possibility for circuit B being seized from a calling circuit A. This is brought about by the operation of relay Er from a make contact of the operated connecting relay of the group Dar to Dcr, via break contact $D_4$. Relay Er carries ten changeover contacts $E_{1-10}$, one in series with each of the circuits provided between the access relays Aar to Ajr and the corresponding circuit A. By the fact that these changeover contacts are operated, the circuit B is rendered unavailable for a calling circuit A, because the operating circuit for the corresponding access relay is opened for a calling circuit A at the corresponding break contact $E_{1-10}$.

The closure of make contact $E_{1-10}$, however, does not yet immediately result in the operation of an access relay Aar to Ajr corresponding to a free circuit A, because these access relays are still being shunted from the make contact $Ca_1$ to $Cc_1$ of the operated access relay of the group Car to Ccr. However, after relay Er has operated, it closes a circuit at make contact $E_{11}$ for the operation of relay Gr, which now opens its break contacts $G_{1-13}$. At break contacts $G_{11-13}$ the short circuit across the windings of the access relay Aar to Ajr is removed, so that one of these relays may now operate together with its auxiliary relay Bar to Bjr, and establish connection with a free circuit A. The closure of one of the make contacts $Aa_1$ to $Aj_1$ now has no effect on the condition of the group of relays Car to Ccr, because the circuits between these contacts and the windings of Car to Ccr are opened at break contacts $G_{1-10}$. Consequently, at the operation of one of relays Aar to Ajr, only two lock-out circuits become effective. The first of these is that which prevents more than one relay of the group Aar to Ajr from operating, so that only one free circuit A will be connected. The second lock-out circuit is that which prevents the equally named relays in the other circuits B from operating. This will prevent, in case one of these other circuits B also operates so as to call for a free circuit A, this other circuit B from connecting to the circuit A which was already engaged from the circuit B under consideration.

It will be observed that by the operation of the auxiliary relay of group Xar to Xjr, relay Dr cannot operate now, because the circuit for relay Dr is opened at break contact $E_{12}$, which was previously energised. Consequently, Dr will not energise and will thereby not change the relations between the calling circuit C and circuit B.

Fig. 22 is a modification of Fig. 21 (part P) and has the object of providing an arrangement whereby on calls in the direction from circuit C to circuit A, one of the circuits A is connected selectively. The arrangement operates as follows:

Assuming that circuit B has been engaged from a circuit C, one of the relays of group Car to Ccr and Dar to Dcr would have operated and the operated relay of the first-mentioned group would have locked out the group of relays Aar to Ajr as described in connection with Fig. 21.

On a contact $n+1$ of the operated relay Dar to Dcr a circuit will now be closed via break contact $D_4$ for the operation of relay Fr, Fig. 22, and at its break contact $F_1$ this relay opens a circuit for relay Br which otherwise is operated permanently. This relay Br has ten make contacts inserted between the windings of each of relays Aar to Ajr and the common potential divider, so that by the release of Br the potential is disconnected from all of these windings. Means may now be operated in order to cause the selective operation of one of the circuits A. This means may comprise e. g. a selector switch S which is stepped into a certain position corresponding to the required circuit A. In this position the potential from the potential divider $R_3$, $R_4$ is now connected to one of the relays of the group Aar to Ajr only. In consequence of this, only this one relay may now operate when the operation proceeds.

As a next consequence of the operation of relay Fr and the release of relay Br, a circuit is closed for the operation of relay Er, which acts as described for Fig. 21, i. e. it prepares for calling a free circuit A and energises relay Gr at contact $E_{11}$, which removes the lock-out for all relays Aar to Ajr. With this lock-out removed and potential being connected to one of these relays, it is now possible for only one of these relays to energise, provided the corresponding circuit A is free.

In case of a call from circuit A, it should be assumed that the relay Br is normally operated via break contact $F_1$, so that potential from the potential divider $R_3$, $R_4$ is connected to all of the relays Aar to Ajr. Calls originated at circuit A will therefore operate in exactly the same manner as described in connection with Fig. 21 (part P).

Figure 17:
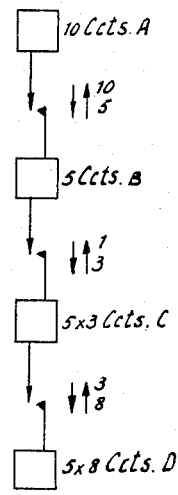
Fig. 17 shows in block diagram an arrangement with four groups of circuits interconnected by three stages of connecting equipment with both-way operation.

Figs. 17 and 23, 24 refer to a case in which four different groups of circuits A, B, C and D may be interconnected by calls originating at either extreme end of the chain of circuits, i. e. a call originating at A will consecutively engage a circuit of groups B, C and D respectively, and a call originating at a circuit D will engage consecutively a circuit in groups C, B and A. The operation of the circuit is as follows: (reference 23/24).

In the example chosed of five circuits B (B1 to B5), five corresponding subgroups of three circuits C (C1-1 to C1-3, C2-1 to C2-3, . . . C5-1 to C5-3) and five corresponding subgroups of eight circuits D (D1-1 to D1-8, W2-1 to D2-8, . . . D5-1 to D5-8). Since circuit B1 has only been shown on Fig. 23, only the connecting equipment concerning subgroup C1-1 to C1-3 has been shown, and from this subgroup only circuit C1-1 has been shown (Fig. 24), further only the connecting equipment D1-1 to D1-8 of circuits D corresponding to circuit B1 has been shown (Fig. 24).

Assuming a call from circuit A, the calling contact CAB will be changed over and connect ground to all free circuits B via break contacts $E_{1-10}$, resistance Ra and via one of the horizontal leads corresponding to the calling circuit, to one of the access relays of the group Aar to Ajr, which operates. This energises the auxiliary relay of group Xar to Xjr, which at its contacts 1 to n establishes the necessary connections between A and B. Further, at the operated make contact $Aa_1$ to $Aj_1$ three lock-out circuits are provided as follows:

The first is that in which the operated relay prevents the operation of all other relays of the same group, thereby preventing the circuit B from being seized from more than one circuit A.

The second lock-out circuit is that by which the equally named access relays of the other circuits B are prevented from operating, thereby causing only one circuit B to be connected to the calling circuit A.

The third lock-out circuit is closed via one of break contacts $G_{1-10}$ and prevents the operation of all relays of the group Car to Ccr, which ensures that the circuit B cannot be engaged from any of the calling circuits C. The operated relay Xar to Xjr closes a ground at its contact $n+1$ via break contact $E_{12}$ for the operation of relay Dr, which operates its changeover contacts $D_{1-3}$. The circuit B is thereby rendered inaccessible to calling circuits C. At make contact $D_5$ relay Gr operates, which opens its contacts $G_{1-13}$ and thereby removes the short-circuits across the windings of relay Car to Ccr. One of these relays corresponding to a free circuit C, will now operate via one of make contacts $D_{1-3}$ and break contact $J_1$ at the corresponding circuit C. The operated relay of the group Car to Ccr, by closing its make contact $Ca_1$ to $Cc_1$, energises its auxiliary relay of group Dar to Dcr, which establishes the necessary connections between circuits B and C. The make contact $n+1$ on the operated relay Dar to Dcr cannot energise relay Er, because the circuit for this is open at break contact $D_4$. At the operated make contact $Ca_1$ to $Cc_1$ two lock-out circuits are provided as follows:

In the first place, a circuit is closed from the make contact of the operated relay of the group to shunt out all other relays of the same group.

In the second place, a circuit is closed from this operated relay via break contact $K_1$ to rectifiers connected to the windings of the access relays Ear to Egr of the circuit C corresponding to the operated relay of the group Car to Ccr.

The first-mentioned lock-out circuit prevents the circuit B to be connected to more than one circuit C at a time. The second lock-out circuit is provided in order to render circuit C unavailable for calls originated at circuit D as will be explained later.

It will be noticed that the circuits from the make contacts $Ca_1$ to $Cc_1$ to the windings of relay Aar to Ajr are opened at break contacts $G_{11-13}$, so that the access relays Aar to Ajr are not affected by the operation of the access relays Car to Ccr.

At the make contact $n+2$ of the operated relay of group Dar to Dcr, a circuit is closed via break contact $J_2$ for the operation of a relay Hr at the circuit C that was engaged. This relay Hr carries eight changeover contacts, one for each of the circuits D to which the engaged circuit C may obtain access and which are interposed between the contact CDC of the circuits D and the winding of relays Ear to Egr provided for the interconnection of circuits C and D. By the opening of break contacts $H_{1-8}$ the engaged circuit C is rendered definitely unavailable to calling circuits D, but the closure of the make contacts $H_{1-8}$ does not yet operate any of the access relays Ear to Egr, since these are still kept short-circuited from the operated access relay of the group Car to Ccr. With Hr operated, a circuit is closed at contact $H_9$ for the energisation of relay Kr which now opens its break contacts $K_1$ and $K_2$. $K_1$ removes the short circuit for the group of relays Ear to Egr provided by the operated relay of the group Car to Ccr. As a consequence, one of the group of relays Ear to Egr may now operate via one of the make contacts $H_{1-8}$ and the break contact of contact CDC of the corresponding circuit D, assuming this is free. By the operation of one of relays Ear to Egr, its auxiliary relay of group Far to Fgr energises and establishes the required connections between the circuits C and D. A circuit closed at make contact $n+1$ of the operated relay of the group Far to Fgr will not be effective to operate relay Jr, because this circuit is opened at break contact $H_{10}$, relay Hr being previously operated.

At the make contact of the operated relay of the group Ear to Egr, lock-out circuits are provided as follows:

In the first place, the operated relay locks out all others of the same group, in order to prevent more than one circuit D becoming connected to the calling circuit C.

In the second place, the equally named relays of the other circuits C are locked out in order to prevent these other circuits C, when calling for a circuit D, from becoming connected to the circuit D which is already engaged by the circuit C under consideration.

A third lock-out circuit which is provided from the operated make contact of the group $Ea_1$ to $Eg_1$ to the winding of the relays of the group Car to Ccr corresponding to the circuit C under consideration, is opened at break contact $K_2$, so that this is not effective and the condition of the corresponding relay of group Car to Ccr is unaffected.

Taking now the case of a call originating at a circuit D, this will be characterised by the operation of the calling contact CDC at circuit D. This provides ground to all circuits C to which circuit D has access, via the corresponding break contacts $H_{1-8}$ and resistance Rd, in all of these circuits C (provided they are free) to the horizontal lead corresponding to the circuit D under consideration and to the corresponding relay of the group Ear to Egr, which operates. The closure of one of the contacts $Ea_1$ to $Eg_1$ operates the auxiliary relay of the group Far to Fgr, which establishes the connection between the calling circuit D and the engaged circuit C, and which also provides three lock-out circuits as follows:

The first lock-out circuit is that by which the operated relay locks out all others of the same group, so as to prevent more than one calling circuit D from becoming connected to the circuit C.

The second is that by which the equally named relays of the other circuits C are locked-out in order that only one circuit C shall be connected to the calling circuit D at a time.

The third lock-out circuit is that provided via rectifiers and break contact $K_2$ to the winding of the relay corresponding to the circuit C under consideration in the group of relays Car to Ccr and which has the purpose of rendering the circuit C under consideration unavailable to a call from circuit B.

At a make contact $n+1$ of the operated relay of the group Far to Fgr a circuit is closed via break contact $H_{10}$ for relay Jr, which now energises, Jr at its changeover contact $J_1$ opens the ground to which the corresponding relays of the group Car to Ccr would operate in case of a call from circuit B to one of the circuits C. At the same time, the closure of make contact of $J_1$ prepares for the interconnection of the circuit C under consideration with circuit B when this is free. The operation of the relay of the group Car to Ccr corresponding to circuit C under consideration is prevented for the moment, however, owing to the lock-out provided via break contact $K_2$, at one of make contacts $Ea_1$ to $Eg_1$. With relay Jr operated, a circuit is closed for the operation of Kr at contact $J_3$ which now by opening contact $K_2$ removes this lock out.

The possibility is provided that a circuit C, when engaged from a circuit D, does not immediately call for the circuit B to which it has access, but that this happens only at a later stage of the operation which is characterised by the closure of the calling contact CCB. Assuming this happens, a circuit will be closed from ground at make contact $J_1$ via contact CCB and break contact of the group $D_{1-3}$ corresponding to the circuit C in question, via resistance Rc to the horizontal wire and the relay of the group Car to Ccr corresponding to the circuit C. This relay now operates, energises its auxiliary relay of group Dar to Dcr, which establishes connection between circuits C and B and provides lock-out circuits as follows:

In the first place, the operated relay of the group Car to Ccr prevents the other relays of the same group from operating in order to prevent the circuit B from being seized from more than one circuit C at a time.

In the second place, a circuit is provided via one of the make contacts $G_{11-13}$ to the windings of all relays of the group Aar to Ajr, thereby rendering circuit B unavailable to calling circuits A.

A third lock-out circuit from the operated make contact of the group $Ca_1$ to $Cc_1$ to the windings of relay Ear to Egr is rendered ineffective by the operated condition of relay Kr, so that relays Ear to Egr are not affected. On contact $n+1$ of the operated relay of the group Dar to Dcr a circuit is closed via break contact $D_4$ for operating relay Er, which carries ten changeover contacts $E_{1-10}$, each inserted in one of the operating circuits for the group of relays Aar to Ajr. By the operation of these contacts the operating circuit for these relays is definitely opened for calling circuits A, and a circuit is prepared for operating these relays in order to engage a free circuit A from circuit B. For the moment this operation is prevented because the group of relays Aar to Ajr is locked out by the operated contact of the group $Ca_1$ to $Cc_1$. With relay $Er$ operated a circuit is closed at contact $E_{11}$ for $Gr$, which opens its contacts $G_{1-13}$ and thereby removes the lock out circuit referred to.

One of the relays $Aar$ to $Ajr$ will now operate, energise its auxiliary relay of group $Xar$ to $Xjr$, which provides the necessary interconnection between circuits B and A and at its make contact provide the following lock-out circuits:

In the first place the operated relay will lock-out all other relays of the same group so that only one of the free circuits A is able to become connected to the circuit B.

In the second place, the equally named relay associated with all other circuits B is locked out, so that if these other circuits B would call for a free circuit A, the circuit A engaged by the circuit B under consideration, would be unavailable to these circuits.

A third lock out circuit which is provided from the make contacts $Aa_1$ to $Aj_1$ to the windings of relays $Car$ to $Ccr$ is rendered ineffective by the fact that contacts $G_{1-10}$ are open, owing to which the condition of relays $Car$ to $Ccr$ is not affected.

Other suitable types of two-position potential-responsive devices can replace the electromagnetic light-current contact-making relays used in all the embodiments described.

While the principles of the invention have been described above in connection with specific embodiments and particular modifications thereof, it is to be clearly understood that this description is made only by way of example and not as a limitation on the scope of the invention.

What we claim is:

1. Discriminating means for determining on which of a number of conductors an electrical condition is applied comprising a plurality of detector devices accessible over said conductors and adapted to be selectively operated according to which conductor receives the electrical condition, a plurality of switch means, means for operating respective of said switch means in response to the operation of respective detector devices, and unidirectional current-carrying devices interconnecting each of said switch means and all of said detector devices other than that which causes the operation of said switch means, a source of potential connected to all of said switch means, whereby that switch operation, characteristic of a particular application of said electrical condition to said conductors, connects electric potential from said source via said unidirectional current-carrying devices to the non-operated detector devices to maintain them inoperative.

2. Discriminating means, according to claim 1, in which the source of potential has a voltage higher than that which each said unidirectional current-carrying device will carry without breakdown, said discriminating means further comprising means for adjusting the potential from said source so that the value of potential across said unidirectional current-carrying device will be below the breakdown potential of said device.

3. Discriminating means, according to claim 1, comprising a second plurality of conductors individual to said detector devices and forming a coordinate array with said first plurality of conductors, said second plurality of conductors being connected respectively to said detector device and forming the operating circuits therefor, unidirectional current-carrying devices interconnecting pairs of conductors, one from each plurality, so that each of said conductors of the first plurality is connected to one or more conductors of the second plurality individual to and characteristic of said conductors of the first plurality, means for applying said electrical condition to any one of said conductors of the first plurality, whereby a corresponding combination of detector devices is operated via the unidirectional current-carrying devices and conductors of said second plurality interconnecting said conductor of the first plurality and said detector devices, a supplementary set of conductors equal in number to said second plurality of conductors, each switch means being connected to one of said supplementary set of conductors, the unidirectional current-carrying devices interconnecting each switch means and the detector devices being connected between the conductors of said first set and the conductors of said supplementary set.

4. Discriminating means, according to claim 1, wherein each of said detector devices comprises a high-speed, low-inertia, electromagnetic, light-current relay having a pair of rigid make contacts which comprises the switch means for connecting electric potential to a unidirectional current-carrying device associated with each switch means and further comprising a helping relay operable by said high-speed relay and make contacts for each helping relay for closing other electrical circuits.

5. Discriminating means, according to claim 1, wherein said detector devices are divided into groups, the number of groups being equal to the number of factors in a particular set of factors of the number of electrical conductors, and the number of detector devices in the various groups being equal respectively to corresponding factors of said set of factors, further comprising interconnections for connecting a plurality of detector devices to each of said electrical conductors including detector devices from all said groups, whereby predetermined number only of detector devices per group can operate at a time and the detector devices simultaneously operated in the different groups form one of a number of predetermined over-all combinations, and only one such combination.

6. Discriminating means, according to claim 1, wherein said detector devices are divided into groups of equal size in which corresponding detector devices have the same significance, further comprising interconnections between said switch means and said detectors via said unidirectional current carrying devices for causing the operation of only one detector device in each group at a time and the operation of only one of each set of corresponding detector devices in all of the groups at a time.

7. Discriminating means comprising a plurality of detector devices, a plurality of electrical conductors each of which is permanently connected to a predetermined plurality of said detector devices, means for applying an operating electrical condition to any one of said conductors, and lockout means controlled by said detector devices for causing the effective operation only one plurality of detector devices when electrical conditions are applied simultaneously to two or more of said conductors, and means operated by said lock-out means when one plurality of detector devices has effectively operated in response to an electrical condition on one conductor for preventing the operation of any other detector devices when an electrical condition is connected to a conductor connected thereto.

8. Discriminating means comprising a first plurality of conductors, a second plurality of conductors, a plurality of detector devices associated each with a conductor of said second plurality of conductors, first unidirectional current carrying devices connecting each conductor of said first plurality of conductors to a corresponding detector device via its associated conductor of said second plurality, means for selectively applying an electrical condition to any one of said first plurality of conductors, and lock-out means comprising switching means each associated with and controlled by a corresponding detector device, a source of potential, a third plurality of conductors each associated with a corresponding detector device, second unidirectional current carrying devices, and including said second unidirectional current-carrying devices between each conductor of said third plurality of conductors and all the conductors of said first plurality of conductors except those connected to the detector device associated with said conductor of said third plurality of conductors, so as to prevent the other detector devices from operating.

9. Discriminating means, according to claim 8, wherein said second unidirectional current carrying devices connect directly said conductors of said third plurality of conductors to the conductors of said first plurality of conductors.

10. Discriminating means, according to claim 8, wherein said second unidirectional current carrying devices connect said conductors of said third plurality of conductors to the conductors of said second plurality of conductors via conductors of said first plurality of conductors and via said first unidirectional current carrying devices in series.

11. Discriminating means, according to claim 8, wherein each of said detector devices comprises a high speed relay, whilst each switching means associated with said detector device consists of the single contact of said high speed relay, and wherein a plurality of said high speed relays are operated in a combination characteristic of the conductor to which said electrical condition is applied in said first plurality of conductors, and means controlled by the corresponding single contacts of said operated high speed relays for applying the potential from the source to the corresponding second unidirectional current carrying devices which are made conductive in circuits shunting all other high speed relays which do not belong to said characteristic combination, thereby preventing the combinations characteristic of all other conductors of said plurality of conductors from being operated.

12. Means for controlling the utilization of common equipment comprising two sets of individual equipments each set having a set of conductors, detector devices connected individually to the conductors of said sets, and lock-out means associated in common with said sets of individual equipments, for preventing the operation of all other of said relays when one of said relays is operated, said lock-out means comprising a plurality of switch means, means for operating respective of said switch means in response to the operation of respective detector devices, and unidirectional current-carrying devices interconnecting each of said switch means and all of said detector devices other than that which causes the operation of said switch means, a source of potential connected to all of said switch means, whereby that switch operation, characteristic of a particular application of said electrical condition to said conductor, connects electric potential from said source via said unidirectional current-carrying devices to the non-operated detector devices to maintain them inoperative.

13. Discriminating means comprising a first plurality of conductors, a plurality of detector relays connected each to one of said conductors, a second plurality of conductors one for each relay, means for selectively applying an electric potential directly to one of said first set of conductors for operating the detector relay connected thereto, unidirectional current carrying devices connecting each conductor of said second set with a group of conductors of said first set, including all but one conductor thereof, each group, thus connected, having a different combination of conductors therein from any other group, a make contact on each of said relays for connecting a potential to the conductor of said second set to which the conductor of said first set which is connected to said relay is not connected over said unidirectional current-carrying devices, whereby to maintain the other relays inoperative when said relay operates.

14. Discriminating arrangement, as claimed in claim 13, further comprising a plurality of circuits, a common circuit, the conductors of said first set of conductors being test conductors each corresponding to an individual one of said circuits to be tested for a certain condition and responsive to the operation of a detector relay for connecting physically to said common circuit that one of the circuits of said plurality of circuits for which the test has been successful.

15. Discriminating means, according to claim 13, further comprising a common operating source of potential for the detector relays and a potentiometer connected across said source, each detector relay being connected in parallel with other detector relays to said common source of operating potential at an intermediate point of said potentiometer.

16. Discriminating means, as claimed in claim 14, a plurality of circuits is divided into two groups, said conductors of said first plurality of conductors and the corresponding detector relays are divided into two groups each associated with a different group of circuits to be tested and associated with the common circuit, the test conductors of the circuits of a first plurality of circuits to be tested being connected to the corresponding conductors of said first plurality of conductors in a first of said groups, whilst the test conductors of the circuits of a second plurality of circuits are connected to the corresponding conductors of said first plurality of conductors in the second of said groups, said unidirectional current carrying devices connecting all the conductors of said first plurality of conductors in one of the groups to all the detector relay contacts in the other group, whereby said common circuit can be seized either by any one circuit from said first plurality of circuits or from any one circuit from said second plurality of circuits, the common circuit being prevented from being seized simultaneously either by two or more circuits of a same plurality of circuits or by circuits of both pluralities of circuits.

References Cited in the file of this patent
UNITED STATES PATENTS
2,594,389  Bruce _____ Apr. 29, 1952